United States Patent
Yasuda et al.

(10) Patent No.: US 9,485,033 B2
(45) Date of Patent: Nov. 1, 2016

(54) SIGNAL PROCESSING APPARATUS AND SIGNAL PROCESSING METHOD

(71) Applicants: Wakako Yasuda, Tokyo (JP); Daisaku Ogasahara, Tokyo (JP); Shinsuke Fujisawa, Tokyo (JP)

(72) Inventors: Wakako Yasuda, Tokyo (JP); Daisaku Ogasahara, Tokyo (JP); Shinsuke Fujisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 14/350,125

(22) PCT Filed: Oct. 5, 2012

(86) PCT No.: PCT/JP2012/006441
§ 371 (c)(1),
(2) Date: Apr. 7, 2014

(87) PCT Pub. No.: WO2013/051289
PCT Pub. Date: Apr. 11, 2013

(65) Prior Publication Data
US 2014/0286638 A1 Sep. 25, 2014

(30) Foreign Application Priority Data

Oct. 5, 2011 (JP) .................................. 2011-221314
Oct. 3, 2012 (WO) .................. PCT/JP2012/006323

(51) Int. Cl.
*H04J 14/06* (2006.01)
*H04B 10/61* (2013.01)
*H04L 27/38* (2006.01)

(52) U.S. Cl.
CPC ........ *H04B 10/6166* (2013.01); *H04B 10/612* (2013.01); *H04B 10/614* (2013.01); *H04B 10/6164* (2013.01); *H04B 10/6165* (2013.01); *H04J 14/06* (2013.01); *H04L 27/3818* (2013.01)

(58) Field of Classification Search
CPC ............ H04B 10/6166; H04B 10/612; H04B 10/614; H04B 10/6164; H04B 10/6165; H04J 14/06; H04L 27/3818
USPC ....... 398/183, 184, 185, 186, 187, 188, 198, 398/65, 152, 158
See application file for complete search history.

(56) References Cited

U.S. PATENT DOCUMENTS 5,363,408 A 11/1994 Paik et al.
8,515,293 B2 * 8/2013 Yasuda .................. H04B 10/60
398/208

(Continued)

FOREIGN PATENT DOCUMENTS

FR EP 2169867 A1 * 3/2010 ............. H04B 10/61
JP 2000-83071 A 3/2000

(Continued)

OTHER PUBLICATIONS

S.J. Savory et al., "Transmission of 42.8Gbit/s Polarization Multiplexed NRZ-QPSK over 6400km of Standard Fiber with no Optical Dispersion Compensation", OTuA.1.pdf, Optical Society of America, 2006, OSA1-55752-830-6.

Timo Pfau et al., "Hardware-Efficient Coherent Digital Receiver Concept With Feedforward Carrier Recovery for M-QAM Constellations", Journal of Lightwave Technology, vol. 27, No. 8, Apr. 15, 2009, IEEE, pp. 989-999.

(Continued)

*Primary Examiner* — M. R. Sedighian

(57) ABSTRACT

Signal processing means includes carrier compensation means for compensating for a phase difference and a frequency difference between signal light and local light in relation to two polarization signals, so as to generate two carrier compensated signals, symbol determination means for demodulating the two carrier compensated signals on the basis of a signal arrangement of multi-value modulation, symbol rough-determination means for demodulating the two carrier compensated signals on the basis of a signal arrangement in which the number of multi-values of the multi-value modulation is reduced, selection means for selecting either of an output of the symbol determination means and an output of the symbol rough-determination means, and coefficient setting means for updating filter coefficients of polarized wave separation means by using an output selected by the selection means.

19 Claims, 19 Drawing Sheets

(56) References Cited

U.S. PATENT DOCUMENTS

| | | | |
|---|---|---|---|
| 2007/0201588 A1 | 8/2007 | Loiseau et al. | |
| 2010/0003028 A1* | 1/2010 | Zhang .................... | H04B 10/61 398/65 |
| 2010/0142952 A1* | 6/2010 | Qian ................... | H04B 10/2513 398/65 |
| 2011/0052215 A1 | 3/2011 | Zhou | |
| 2011/0150478 A1 | 6/2011 | Winzer | |
| 2011/0150503 A1* | 6/2011 | Winzer ................. | H04B 10/60 398/202 |

FOREIGN PATENT DOCUMENTS

| | | |
|---|---|---|
| JP | 2003-179659 A | 6/2003 |
| JP | 2004-153837 A | 5/2004 |
| JP | 2005-523633 A | 8/2005 |
| JP | 2007-318800 A | 12/2007 |
| JP | 2009-296596 A | 12/2009 |
| JP | 2010-98617 A | 4/2010 |

OTHER PUBLICATIONS

International Search Report for PCT Application No. PCT/JP2012/006441, mailed on Dec. 11, 2012.

P. J. Winzer et al., "Spectrally Efficient Long-Haul Optical Networking Using 112-Gb/s Polarization-Multiplexed 16-QAM", IEEE Journal of Lightwave Technology, the United States, IEEE, Feb. 15, 2010, vol. 28, No. 4, pp. 547-556.

"Laser Linewidth Tolerance for 16-QAM Coherent Optical Systems Using QPSK Partitioning", IEEE Photonics Technology Letters, the United States, IEEE, Feb. 22, 2010, vol. 22, Issue 9, pp. 631-633.

Seb J. Savory, "Digital Coherent Optical Receivers: Algorithms and Subsystems", IEEE Journal of Selected Topics in Quantum Electronics, the United States, IEEE, May 17, 2010, vol. 16, Issue 5, pp. 1164-1179.

Japanese Office Action for JP Application No. 2013-537431 mailed on Sep. 6, 2016 with English Translation.

* cited by examiner

FIG. 9

|  | F | E | D | C | B | A | 0 | 9 | 8 | 7 | 6 | 5 | 4 | 3 | 2 | 1 |  |
|---|---|---|---|---|---|---|---|---|---|---|---|---|---|---|---|---|---|
| $\frac{14}{15}a$ | F1 | E1 | D1 | C1 | B1 | A1 | 01 | 91 | 81 | 71 | 61 | 51 | 41 | 31 | 21 | 11 | 1 |
| $\frac{12}{15}a$ | F2 | E2 | D2 | C2 | B2 | A2 | 02 | 92 | 82 | 72 | 62 | 52 | 42 | 32 | 22 | 12 | 2 |
| $\frac{10}{15}a$ | F3 | E3 | D3 | C3 | B3 | A3 | 03 | 93 | 83 | 73 | 63 | 53 | 43 | 33 | 23 | 13 | 3 |
| $\frac{8}{15}a$ | F4 | E4 | D4 | C4 | B4 | A4 | 04 | 94 | 84 | 74 | 64 | 54 | 44 | 34 | 24 | 14 | 4 |
| $\frac{6}{15}a$ | F5 | E5 | D5 | C5 | B5 | A5 | 05 | 95 | 85 | 75 | 65 | 55 | 45 | 35 | 25 | 15 | 5 |
| $\frac{4}{15}a$ | F6 | E6 | D6 | C6 | B6 | A6 | 06 | 96 | 86 | 76 | 66 | 56 | 46 | 36 | 26 | 16 | 6 |
| $\frac{2}{15}a$ | F7 | E7 | D7 | C7 | B7 | A7 | 07 | 97 | 87 | 77 | 67 | 57 | 47 | 37 | 27 | 17 | 7 |
|  | F8 | E8 | D8 | C8 | B8 | A8 | 08 | 98 | 88 | 78 | 68 | 58 | 48 | 38 | 28 | 18 | 8 |
| $-\frac{2}{15}a$ | F9 | E9 | D9 | C9 | B9 | A9 | 09 | 99 | 89 | 79 | 69 | 59 | 49 | 39 | 29 | 19 | 9 |
| $-\frac{4}{15}a$ | F0 | E0 | D0 | C0 | B0 | A0 | 00 | 90 | 80 | 70 | 60 | 50 | 40 | 30 | 20 | 10 | 10 |
| $-\frac{6}{15}a$ | FA | EA | DA | CA | BA | AA | 0A | 9A | 8A | 7A | 6A | 5A | 4A | 3A | 2A | 1A | 11 |
| $-\frac{8}{15}a$ | FB | EB | DB | CB | BB | AB | 0B | 9B | 8B | 7B | 6B | 5B | 4B | 3B | 2B | 1B | 12 |
| $-\frac{10}{15}a$ | FC | EC | DC | CC | BC | AC | 0C | 9C | 8C | 7C | 6C | 5C | 4C | 3C | 2C | 1C | 13 |
| $-\frac{12}{15}a$ | FD | ED | DD | CD | BD | AD | 0D | 9D | 8D | 7D | 6D | 5D | 4D | 3D | 2D | 1D | 14 |
| $-\frac{14}{15}a$ | FE | EE | DE | CE | BE | AE | 0E | 9E | 8E | 7E | 6E | 5E | 4E | 3E | 2E | 1E | 15 |
|  | FF | EF | DF | CF | BF | AF | 0F | 9F | 8F | 7F | 6F | 5F | 4F | 3F | 2F | 1F | 16 |

Columns (bottom axis): $-\frac{14}{15}a$, $-\frac{12}{15}a$, $-\frac{10}{15}a$, $-\frac{8}{15}a$, $-\frac{6}{15}a$, $-\frac{4}{15}a$, $-\frac{2}{15}a$ | $\frac{2}{15}a$, $\frac{4}{15}a$, $\frac{6}{15}a$, $\frac{8}{15}a$, $\frac{10}{15}a$, $\frac{12}{15}a$, $\frac{14}{15}a$ Axes: Q (vertical), I (horizontal), $ID_Q$, $ID_I$

SIGNAL PROCESSING APPARATUS AND SIGNAL PROCESSING METHOD

This application is a National Stage Entry of PCT/JP2012/006441 filed Oct. 5, 2012, which claims priority from Japanese Patent Application 2011-221314 filed Oct. 5, 2011, and PCT Application No. PCT/JP2012/006323 filed Oct. 3, 2012, the contents of all of which are incorporated herein by reference, in their entirety.

TECHNICAL FIELD

The present invention relates to a signal processing apparatus which receives an optical signal in a digital coherent method, and a signal processing method.

BACKGROUND ART

With the spread of the Internet, a volume of data for communication has increased. In order to cope therewith, it has become necessary to increase a capacity of a transmission path. As one of techniques for realizing large capacity, there is a multi-value modulation signal (polarization division multiplexed-quadrature amplitude modulation: PDM-QAM). An optical signal on which the PDM-QAM modulation has been performed in a transmitter is demodulated in an optical receiver of a digital coherent method (for example, refer to Patent Document 1).

In addition, Patent Document 2 discloses that a signal obtained by adding an output from a slicer to an input to the slicer, and a signal obtained by making the output from the slicer pass through a division device, are used as an input to a feedback filter.

Further, Patent Document 3 discloses that a filter coefficient of a digital filter is controlled in a feedback manner.

RELATED DOCUMENT

Patent Document

[Patent Document 1] Japanese Unexamined Patent Publication No. 2010-98617
[Patent Document 2] PCT Japanese Translation Patent Publication No. 2005-523633
[Patent Document 3] Japanese Unexamined Patent Publication No. 2007-318800

DISCLOSURE OF THE INVENTION

A decision directed (DD) algorithm is used in a method of separating polarized waves from a PDM-QAM signal. The DD algorithm feeds back a determination result to a filter coefficient, and thus each symbol of the QAM signal can be made to converge. In addition, the DD algorithm has high tracking performance to polarization rotation. On the other hand, in the DD algorithm, if a filter coefficient is started from any initial value, the filter coefficient hardly converges.

An object of the present invention is a signal processing apparatus and an optical signal reception method capable of making a filter coefficient easily converge even if the filter coefficient is started from any initial value.

DISCLOSURE OF THE INVENTION

According to the present invention, there is provided a signal processing apparatus including polarized wave separation means for receiving four digital signals and generating two polarization signals corresponding to two polarization components of signal light from the four digital signals by using filters having filter coefficients, the four digital signals being generated by performing photoelectric conversion and analog-digital conversion on four output light beams which are generated by making the signal light having undergone polarization division multiplexing and multi-value modulation and local light interfere with each other by using a 90° optical hybrid; carrier compensation means for compensating for a phase difference and a frequency difference between the signal light and the local light in relation to the two polarization signals, so as to generate two carrier compensated signals; determination means for demodulating the two carrier compensated signals; selection means for selecting whether the determination means performs the demodulation on the basis of a signal arrangement of the multi-value modulation or on the basis of a signal arrangement in which the number of multi-values of the multi-value modulation is reduced; and coefficient setting means for updating the filter coefficients of the polarized wave separation means by using an output selected by the selection means.

According to the present invention, there is provided a signal processing method including generating four output light beams by making the signal light having undergone polarization division multiplexing and multi-value modulation and local light interfere with each other by using a 90° optical hybrid; generating four digital signals by performing photoelectric conversion and analog-digital conversion on the four output light beams; generating two polarization signals corresponding to two polarization components of the signal light from the four digital signals by using filters having filter coefficients; compensating for a phase difference and a frequency difference between the signal light and the local light in relation to the two polarization signals, so as to generate two carrier compensated signals; and updating the filter coefficients by using either of a result of demodulating the two carrier compensated signals on the basis of a signal arrangement of the multi-value modulation and a result of demodulating the two carrier compensated signals on the basis of a signal arrangement in which the number of multi-values of the multi-value modulation is reduced.

According to the present invention, there is provided a signal processing apparatus including polarized wave separation means for receiving four digital signals and generating two polarization signals corresponding to two polarization components of signal light from the four digital signals by using filters having filter coefficients, the four digital signals being generated by performing photoelectric conversion and analog-digital conversion on four output light beams which are generated by making the signal light having undergone polarization division multiplexing and multi-value modulation and local light interfere with each other by using a 90° optical hybrid; carrier compensation means for compensating for a phase difference and a frequency difference between the signal light and the local light in relation to the two polarization signals, so as to generate two carrier compensated signals; determination means for demodulating the two carrier compensated signals; first error calculation means for calculating an error of an output of the determination means by using the two polarization signals and the output of the determination means; second error calculation means for calculating an error of the output of the determination means in a method which is simpler than the first error calculation means and does not depend on a determination result, by using the two polarization signals and the output of the determination means; and coefficient setting means for updating the filter coefficients of the polarized wave separation means by using either of an error determination result performed by the first error calculation means and an error determination result performed by the second error calculation means, in which the coefficient setting means updates the filter coefficients by using the error calculation result performed by the second error calculation means until the filter coefficients converge, and updates the filter coefficients by using the error calculation result performed by the first error calculation means after the filter coefficients converge.

According to the present invention, there is provided a signal processing method including generating four output light beams by making the signal light having undergone polarization division multiplexing and multi-value modulation and local light interfere with each other by using a 90° optical hybrid; generating four digital signals by performing photoelectric conversion and analog-digital conversion on the four output light beams; generating two polarization signals corresponding to two polarization components of the signal light from the four digital signals by using filters having filter coefficients; compensating for a phase difference and a frequency difference between the signal light and the local light in relation to the two polarization signals, so as to generate two carrier compensated signals; and updating the filter coefficients by using an error calculation result based on a first method until the filter coefficients converge, and updates the filter coefficients by using an error calculation result based on a second method which has higher accuracy than the first method after the filter coefficients converge.

According to the present invention, in a reception process of an optical signal having undergone polarization division multiplexing and multi-value modulation, it is possible to make a filter coefficient easily converge even if the filter coefficient is started from any initial value.

The above-described object, and other objects, features and advantages will become apparent from preferred embodiments described below and the following accompanying drawings.

BRIEF DESCRIPTION OF THE DRAWINGS

FIG. 9 is a diagram illustrating determination of a region.

DESCRIPTION OF EMBODIMENTS

Figure 1:
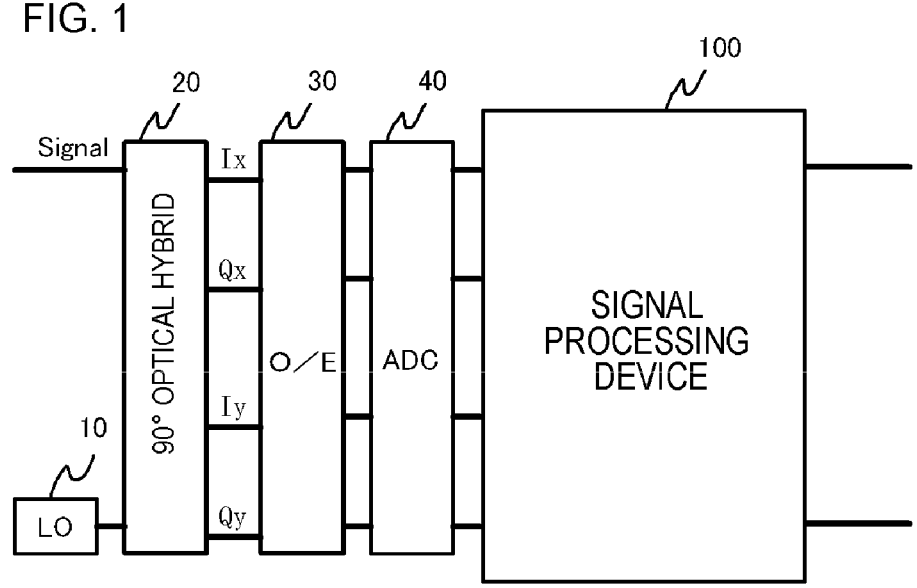
FIG. 1 is a diagram illustrating a configuration of a signal processing apparatus according to a first embodiment.

Hereinafter, embodiments of the present invention will be described with reference to the drawings. In addition, throughout all the drawings, the same constituent elements are given the same reference numerals, and description thereof will not be repeated.

First Embodiment

FIG. 1 is a diagram illustrating a configuration of a signal processing apparatus according to a first embodiment. The signal processing apparatus is used as a digital coherent receiver. A signal light which is input to the signal processing apparatus has undergone polarization division multiplexing and multi-value modulation. The signal processing apparatus includes a local light source (LO) 10, a 90° optical hybrid 20, a photoelectric (O/E) conversion unit 30, an analog-digital conversion unit (ADC) 40, and a signal processing device 100.

A signal light from a transmission path and a local light from the local light source 10 are input to the 90° optical hybrid 20. The 90° optical hybrid 20 makes the optical signal and the local light interfere with each other at a phase difference of 0 so as to generate a first optical signal ($I_x$), and makes the optical signal and the local light interfere with each other at a phase difference of π/2 so as to generate a second optical signal ($Q_x$). In addition, the 90° optical hybrid 20 makes the optical signal and the local light interfere with each other at a phase difference of 0 so as to generate a third optical signal ($I_y$), and makes the optical signal and the local light interfere with each other at a phase difference of π/2 so as to generate a fourth optical signal ($Q_y$). The first optical signal and the second optical signal form a set of signals, and the third optical signal and the fourth optical signal form a set of signals.

The photoelectric conversion unit 30 performs photoelectric conversion on the four optical signals (output light) generated by the 90° optical hybrid 20, so as to generate four analog signals.

The analog-digital conversion unit 40 converts the four analog signals generated by the photoelectric conversion unit 30 into digital signals, respectively.

The signal processing device 100 processes the four digital signals generated by the analog-digital conversion unit 40, so as to generate demodulated signals which are demodulation results of the optical signals.

Figure 2:
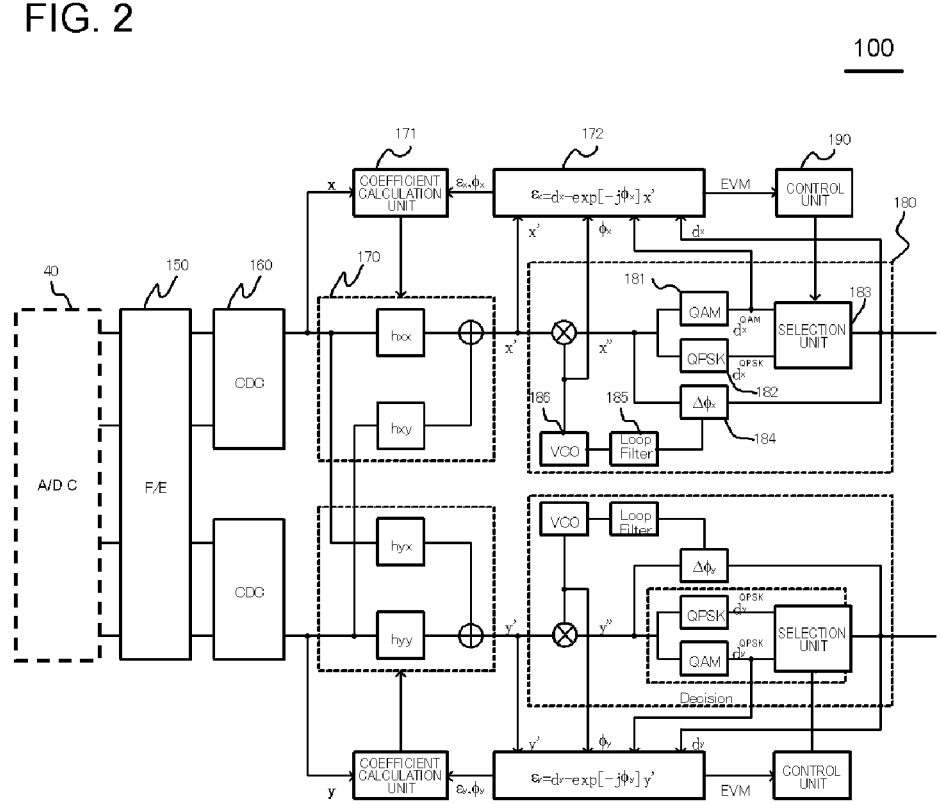
FIG. 2 is a block diagram illustrating a configuration of a signal processing device.

FIG. 2 is a functional block diagram illustrating a configuration of the signal processing device 100. In addition, the signal processing device 100 is, for example, a single semiconductor chip. However, the signal processing device 100 may be a field-programmable gate array (FPGA), and a function thereof may be realized using a program.

The signal processing device 100 includes front-end (F/E) processing units 150, dispersion compensation (CDC) units 160, polarized wave separation units 170, coefficient calculation units 171, first error calculation units 172, carrier compensation sections 180, and control units 190. Each of the carrier compensation sections 180 includes a symbol determination unit 181, a symbol rough-determination unit 182, and a selection unit 183.

The front-end processing units 150 compensate for signal distortions which are contained in the received signals Ix, Qx, Iy and Qy and are caused by imperfect optical parts of the 90° optical hybrid 20 and the photoelectric conversion unit 30. In addition, the dispersion compensation units 160 compensate for linear distortions which are applied to the received signals Ix, Qx, Iy and Qy in the transmission path. Further, the received signals Ix, Qx, Iy and Qy are input to the polarized wave separation units 170 for each polarized wave.

The polarized wave separation units 170 perform a filter operation on each polarized wave by using filter coefficients $h_{xx}$, $h_{xy}$, $h_{yx}$ and $h_{yy}$ in accordance with the following Equation (1), so as to output x' and y'.

[Equation 1]

$$x' = h_{xx} \cdot x + h_{xy} \cdot y$$

$$y' = h_{yx} \cdot x + h_{yy} \cdot y \quad (1)$$

The filter outputs x' and y' are separated as polarized waves X' and Y' which are incident on the receiver as the signal light. The filter coefficients are determined by the coefficient calculation unit 171. The coefficient calculation units 171 determine the filter coefficients $h_{xx}$, $h_{xy}$, $h_{yx}$ and $h_{yy}$ by using an output signal of the selection unit 183. A method of the coefficient calculation units 171 determining the filter coefficients $h_{xx}$, $h_{xy}$, $h_{yx}$ and $h_{yy}$ will be described later.

The carrier compensation sections 180 compensate for a frequency difference and a phase difference of the signal light and the local light so as to generate carrier compensated signals x" and y" from the output signals x' and y' of the polarized wave separation units 170. Each of the carrier compensation sections 180 includes the symbol determination unit 181, the symbol rough-determination unit 182, the selection unit 183, a phase rotation angle calculation unit 184, a loop filter 185, and a voltage controlled oscillator (VCO) 186.

The symbol determination unit 181 performs symbol determination on the output signals x' and y' of the polarized wave separation units 170 on the basis of a standard of the signal light input to the 90° optical hybrid 20. For example, in a case where a standard of the signal light input to the 90° optical hybrid 20 is 16QAM, the symbol determination unit 181 performs the symbol determination in a 16QAM method in accordance with the following Equation (2). In the following description, the symbol determination unit 181 is assumed to perform the symbol determination in the 16QAM method. In addition, symbol determination methods in the symbol determination unit 181 are not limited to the 16QAM method.

[Expression 2]

$$d_z^{QAM} \begin{cases} 3+3j; & 2 < \mathrm{Re}(z''), 2 < \mathrm{Im}(z'') \\ 3+j; & 2 < \mathrm{Re}(z''), 0 < \mathrm{Im}(z'') < 2 \\ 1+3j; & 0 < \mathrm{Re}(z'') < 2, 2 < \mathrm{Im}(z'') \\ 1+j; & 0 < \mathrm{Re}(z''), < 2, 0 < \mathrm{Im}(z'') < 2 \\ 3-3j; & 2 < \mathrm{Re}(z''), \mathrm{Im}(z'') < -2 \\ 3-j; & 2 < \mathrm{Re}(z''), -2 < \mathrm{Im}(z'') < 0 \\ 1-3j; & 0 < \mathrm{Re}(z'') < 2\mathrm{Im}(z'') < -2 \\ 1-j; & 0 < \mathrm{Re}(z'') < 2, -2 < \mathrm{Im}(z'') < 0 \\ -3-3j; & \mathrm{Re}(z'') < -2\mathrm{Im}(z'') < -2 \\ -3-j; & \mathrm{Re}(z'') < -2, -2 < \mathrm{Im}(z'') < 0 \\ -1-3j; & -2 < \mathrm{Re}(z'') < 0\mathrm{Im}(z'') < -2 \\ -1-j; & -2 < \mathrm{Re}(z'') < 0, -2 < \mathrm{Im}(z'') < 0 \\ -3+3j; & \mathrm{Re}(z'') < -2, 2 < \mathrm{Im}(z'') \\ -3+j; & \mathrm{Re}(z'') < -2, 0 < \mathrm{Im}(z'') < 2 \\ -1+3j; & -2 < \mathrm{Re}(z'') < 0, 2 < \mathrm{Im}(z'') \\ -1+j; & -2 < \mathrm{Re}(z''), < 0, 0 < \mathrm{Im}(z'') < 2 \end{cases} \quad (2)$$

$z = x$ or $y$

The symbol rough-determination units 182 perform symbol determinations on the carrier compensated signals x" and y" on the basis of an arrangement of signals of the number of multi-values smaller than that in the standard of the signal light input to the 90° optical hybrid 20. For example, in a case where the signal light input to the 90° optical hybrid 20 employs the 16QAM method, the symbol rough-determination unit 182 performs the symbol determination in a QPSK method. In addition, even in a case where the number of multi-values of the signal light input to the 90° optical hybrid 20 is larger, the symbol rough-determination unit 182 may perform the symbol determination in the QPSK method. The symbol rough-determination unit 182 performs the symbol determination in accordance with the following Equation (3) in a case of performing the symbol determination in the QPSK method. In the following description, the symbol rough-determination unit 182 is assumed to perform the symbol determination in the QPSK method.

[Expression 3]

$$d_z^{QPSK} \begin{cases} 1+j; & \mathrm{Re}(z'') > 0, \mathrm{Im}(z'') > 0 \\ 1-j; & \mathrm{Re}(z'') > 0, \mathrm{Im}(z'') < 0 \\ -1+j; & \mathrm{Re}(z'') < 0, \mathrm{Im}(z'') > 0 \\ -1-j; & \mathrm{Re}(z'') < 0, \mathrm{Im}(z'') < 0 \end{cases} \quad (3)$$

The selection unit 183 selects and outputs either of a symbol determination result performed by the symbol determination unit 181 and a symbol determination result performed by the symbol rough-determination unit 182. The control unit 190 controls which determination result is selected by the selection unit 183. An output of the selection unit 183 is input to the first error calculation unit 172 and is also used as an output of the carrier compensation section 180.

The phase rotation angle calculation units 184 compare the carrier compensated signals x" and y" with phases of the output signals of the selection units 183 so as to calculate phase rotation angles based on the phase difference and the frequency difference between the signal light and the local light. The phase rotation angles calculated by the phase rotation angle calculation units 184 are fed back to the outputs x' and y' of the polarized wave separation units 170 through the loop filters 185 and the voltage controlled oscillators 186. If the feedback loop converges, a VCO output becomes a phase estimate value.

When the selection units 183 selects an output of the symbol determination unit 181, the first error calculation units 172 calculate errors of output signals of the symbol determination units 181 by using the phase rotation angles (actually, the outputs of the voltage controlled oscillators 186) calculated by the phase rotation angle calculation units 184 and the outputs x' and y' of the polarized wave separation unit 170. Specifically, the first error calculation units 172 calculate error functions $\epsilon_x^{QAM}$ and $\epsilon_y^{QAM}$ of the decision directed algorithm in accordance with, for example, Equation (4), by using the output signals $d_x^{QAM}$ and $d_y^{QAM}$ of the symbol determination units 181, the phase rotation angles $\phi_x^{QAM}$ and $\phi_y^{QAM}$ calculated by the phase rotation angle calculation units 184, and the outputs x' and y' of the polarized wave separation units 170.

[Equation 4]

$$\epsilon_x^{QAM} = d_x^{QAM}(k) - \exp[-j\phi_x^{QAM}(k)]x'(k)$$

$$\epsilon_y^{QAM} = d_y^{QAM}(k) - \exp[-j\phi_y^{QAM}(k)]y'(k) \quad (4)$$

Here, the errors calculated by the first error calculation units 172 are used for control performed by the control units 190. Specifically, the first error calculation units 172 calculate error vector magnitude (EVM) for every constant number of symbols (for example, every 1000 symbols) in accordance with the following Equation (5). In addition, the EVM is defined by an average amplitude of all symbols, but may be standardized by only using four symbols located at outermost sides in order to reduce circuit size (Equation 6).

[Equation 5]

$$EVM = \sqrt{\frac{\sum_{k=1}^{N_s}|E(k)|^2}{\sum_{k=1}^{N_s}|S_0(k)|^2}} \quad (5)$$

[Equation 6]

$$\sum_{k=1}^{N_s}|S_0(k)|^2 = N_s \quad (6)$$

Here, $N_s$ indicates the number of symbols used in the calculation of the EVM. E(k) indicates an error vector. When $S_0(k)$ indicates an ideal signal vector, and S(k) indicates a received signal vector, E(k) is obtained by $E(k)=S(k)-S_0(k)$. Here, the error vector E(k) is equivalent to $\epsilon_x^{QAM}$ or $\epsilon_y^{QAM}$ and thus the above Equation (5) may be rewritten into the following Equation (7).

[Equation 7]

$$EVM_{Mon} = \sqrt{\frac{\sum_{k=1}^{N_s}|\epsilon_z^{QAM}(k)|^2}{N_s}} \quad (7)$$

The control unit 190 controls an output of the selection unit 183 by using the EVM based on Equation (7). For example, in a case where the EVM is equal to or greater than a predetermined threshold value, the control unit 190 selects a symbol determination result performed by the symbol rough-determination unit 182 as an output of the selection unit 183, and in a case where the EVM is smaller than the predetermined threshold value, the control unit selects a symbol determination result performed by the symbol determination unit 181 as an output of the selection unit 183.

In addition, the first error calculation units 172 calculate errors of output signals of the selection units 183 by using the phase rotation angles calculated by the phase rotation angle calculation units 184 and the outputs x' and y' of the polarized wave separation units 170. The errors calculated here and the phase rotation angles $\phi_x$ and $\phi_y$ calculated by the phase rotation angle calculation units 184 are output to the coefficient calculation units 171.

Specifically, the first error calculation units 172 use the output signals of the selection units 183 instead of the output signals $d_x^{QAM}$ and $d_y^{QAM}$ of the symbol determination units 181 in the above Equation (4) so as to calculate errors of the output signals of the selection units 183. For example, in a case where the selection units 183 select the symbol determinations ($d_x^{QAM}$ and $d_y^{QAM}$) performed by the symbol determination units 181, the first error calculation units 172 calculate errors in accordance with the above Equation (4). In addition, in a case where the selection units 183 select the symbol determinations ($d_x^{QPSK}$ and $d_y^{QPSK}$) performed by the symbol rough-determination units 182, the first error calculation units 172 calculate errors in accordance with the following Equation (8).

[Expression 8]

$$\epsilon_x^{QPSK} = d_x^{QAM}(k) - \exp[-j\phi_x^{QPSK}(k)]x'(k)$$

$$\epsilon_y^{QPSK} = d_y^{QAM}(k) - \exp[-j\phi_y^{QPSK}(k)]y'(k) \quad (8)$$

The coefficient calculation units 171 employ the decision directed algorithm, and update the filter coefficients $h_{xx}$, $h_{xy}$, $h_{yx}$ and $h_{yy}$ of the polarized wave separation units 170 in accordance with the following Equation (9) or (10) by using an error function, a phase estimate value, and polarized wave separation filter inputs x and y. In addition, Equation (9) indicates a case where the selection units 183 select the symbol determinations ($d_x^{QAM}$ and $d_y^{QAM}$) performed by the symbol rough-determination units 182. Equation (10) indicates a case where the selection units 183 select the symbol determinations ($d_x^{QPSK}$ and $d_y^{QPSK}$) performed by the symbol determination unit 181.

[Equation 9]

$$h_{xx}(k+1) = h_{xx}(k) + \mu\epsilon_x^{QAM}\exp[j\phi_x^{QAM}(k)]x^*(k)$$

$$h_{xy}(k+1) = h_{xy}(k) + \mu\epsilon_x^{QAM}\exp[j\phi_x^{QAM}(k)]x^*(k)$$

$$h_{yx}(k+1) = h_{yx}(k) + \mu\epsilon_y^{QAM}\exp[j\phi_y^{QAM}(k)]y^*(k)$$

$$h_{yy}(k+1) = h_{yy}(k) + \mu\epsilon_y^{QAM}\exp[j\phi_y^{QAM}(k)]y^*(k) \quad (9)$$

[Equation 10]

$$h_{xx}(k+1) = h_{xx}(k) + \mu\epsilon_x^{QPSK}\exp[j\phi_x^{QPSK}(k)]x^*(k)$$

$$h_{xy}(k+1) = h_{xy}(k) + \mu\epsilon_x^{QPSK}\exp[j\phi_x^{QPSK}(k)]x^*(k)$$

$$h_{yx}(k+1) = h_{yx}(k) + \mu\epsilon_y^{QPSK}\exp[j\phi_y^{QPSK}(k)]y^*(k)$$

$$h_{yy}(k+1) = h_{yy}(k) + \mu\epsilon_y^{QPSK}\exp[j\phi_y^{QPSK}(k)]y^*(k) \quad (10)$$

In addition, an initial value of the filter coefficient is set as follows, for example. Further, any tap may be used as the number of elements, and seven taps may be used here as an example.

$h_{xx}(0)=[0\ 0\ 0\ 1\ 0\ 0\ 0]$
$h_{xy}(0)=[0\ 0\ 0\ 0\ 0\ 0\ 0]$
$h_{yx}(0)=[0\ 0\ 0\ 0\ 0\ 0\ 0]$
$h_{yy}(0)=[0\ 0\ 0\ 1\ 0\ 0\ 0]$

Next, operations and effects of the present embodiment will be described. In the present embodiment, the control unit 190 selects a symbol determination result performed by the symbol rough-determination unit 182 as an output of the selection unit 183 until a filter coefficient of the coefficient calculation unit 171 converges.

Specifically, the control unit 190 controls an output of the selection unit 183 by using the EVM based on the above Equation (7). For example, in a case where the EVM is equal to or greater than a predetermined threshold value, the control unit 190 determines that a filter coefficient of the coefficient calculation unit 171 does not converge, and selects a symbol determination result performed by the symbol rough-determination unit 182 as an output of the selection unit 183.

Figure 3:
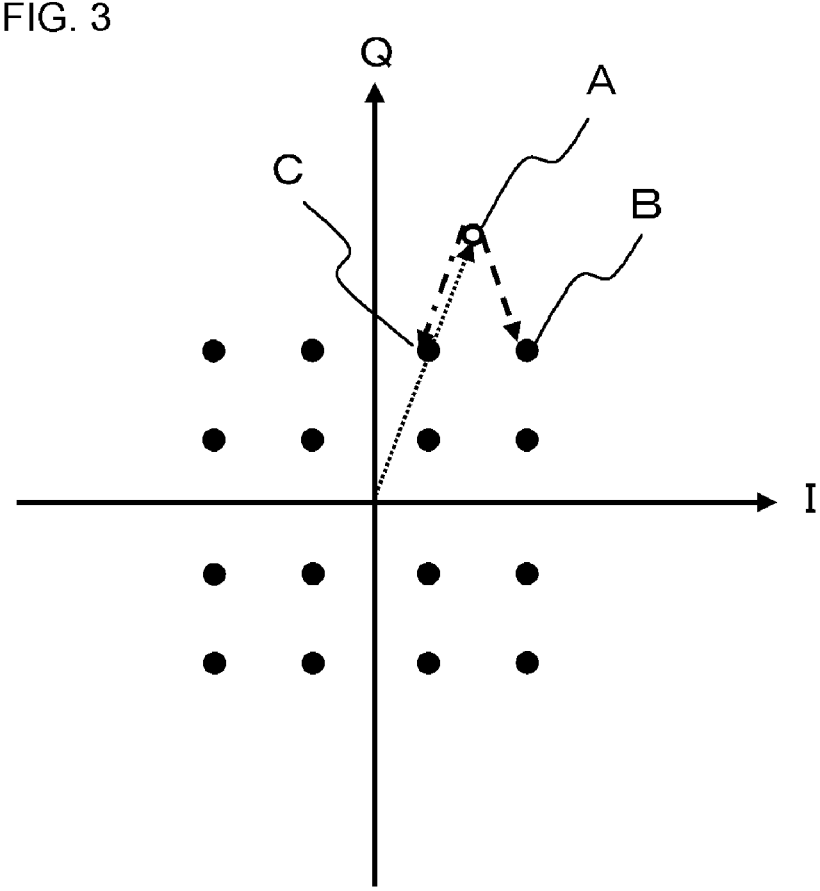
FIG. 3 is a diagram illustrating an effect of the embodiment.

Accompanying effects will be described with reference to FIGS. 3 and 4. FIG. 3 illustrates a case where the symbol determination unit 181 performs a symbol determination in the 16QAM method. The symbol determination unit 181 determines which one of sixteen signals corresponds to an input signal A. Here, the symbol determination unit 181 may not always determine that the signal A is a correct signal B, but may determine that the signal A is a wrong signal C. If this wrong determination result is used by the coefficient calculation unit 171, the filter coefficients $h_{xx}$, $h_{xy}$, $h_{yx}$ and $h_{yy}$ may hardly converge, and may diverge.

Figure 4:
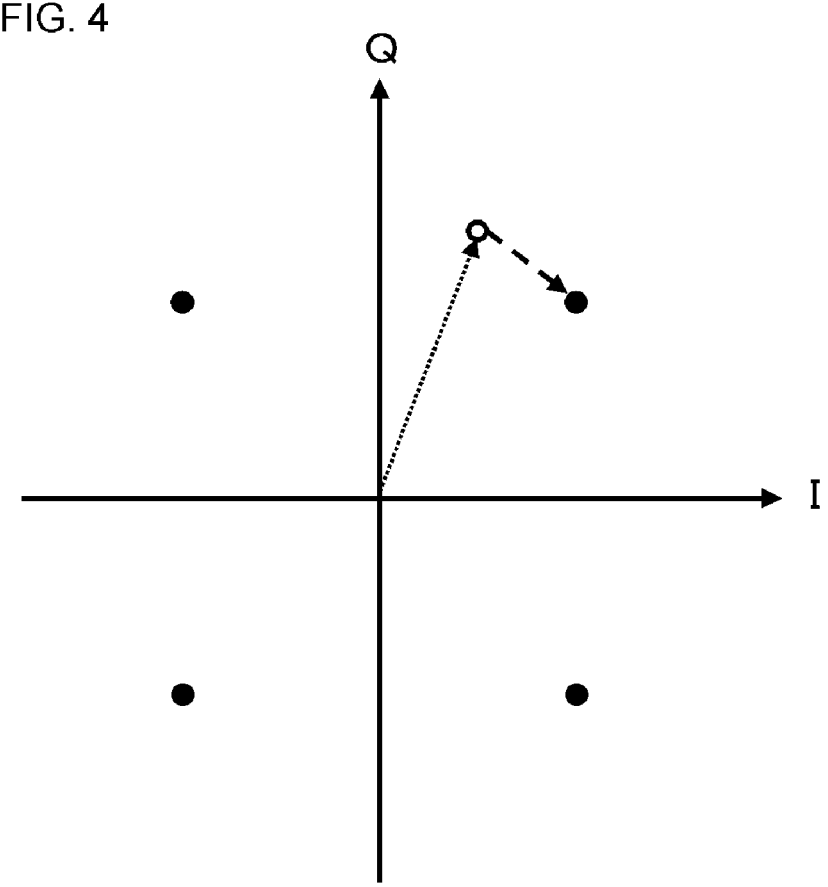
FIG. 4 is a diagram illustrating an effect of the embodiment.

In contrast, as illustrated in FIG. 4, if the symbol rough-determination unit 182 performs the symbol determination, errors hardly occur in the determination performed by the symbol rough-determination unit 182. For this reason, if a symbol determination result performed by the symbol rough-determination unit 182 is selected as an output of the selection unit 183 until a filter coefficient of the coefficient calculation unit 171 converges, the calculation of a filter coefficient performed by the coefficient calculation unit 171 easily leads to convergence of the filter coefficient.

Figure 5:
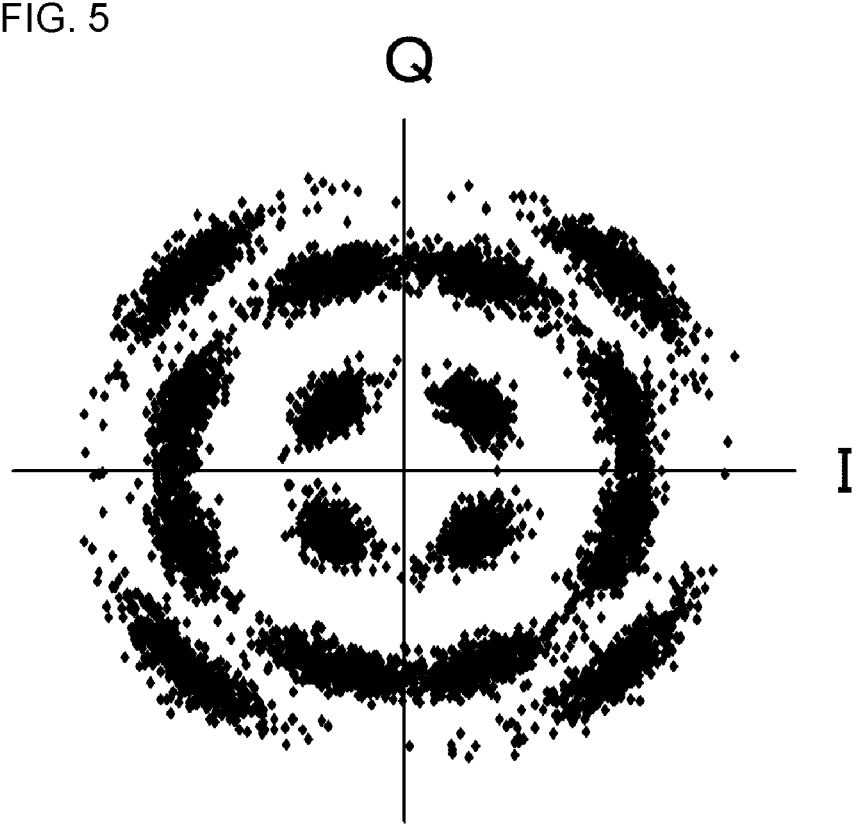
FIG. 5 is a diagram illustrating a constellation of carrier compensated signals x" and y".

FIG. 5 illustrates a constellation of the carrier compensated signals x" and y" in a case where the selection units 183 select symbol determination results performed by the symbol rough-determination units 182, and filter coefficients converge to an extent. As illustrated in FIG. 5, even if the selection units 183 select the symbol determination results performed by the symbol rough-determination units 182, the carrier compensated signals x" and y" do not lose characteristics based on 16QAM.

Figure 6:
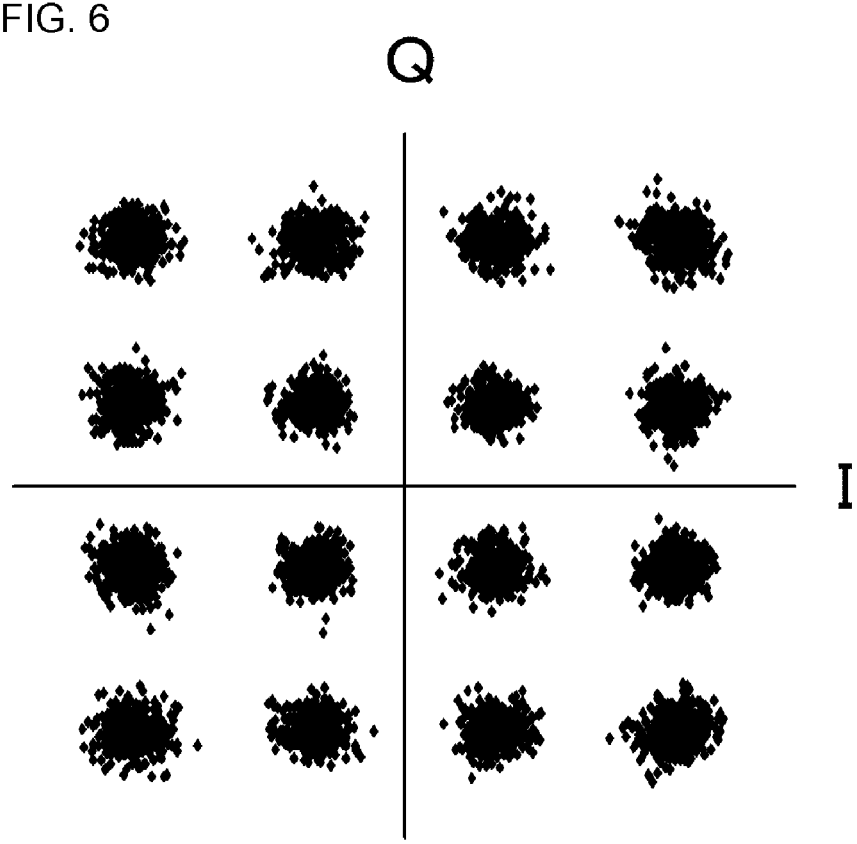
FIG. 6 is a diagram illustrating an example of a determination result performed by a symbol determination unit.

In addition, if the filter coefficients converge to an extent (in a case where the EVM is smaller than the predetermined threshold value), the selection units 183 select symbol determination results performed by the symbol determination units 181. Accordingly, filter coefficients calculated by the coefficient calculation units 171 further converge, and, as a result, a result illustrated in FIG. 6 is obtained. For this reason, the symbol determination unit 181 can perform the symbol determination with high accuracy.

In addition, in a case where a difference between the previous EVM and a newly calculated EVM is equal to or greater than a predetermined threshold value, the control unit 190 may determine that a filter coefficient of the coefficient calculation unit 171 does not converge. In this case, in a case where the difference between the previous EVM and the newly calculated EVM is smaller than the predetermined threshold value, the control unit 190 determines that a filter coefficient of the coefficient calculation unit 171 converges.

Figure 7:
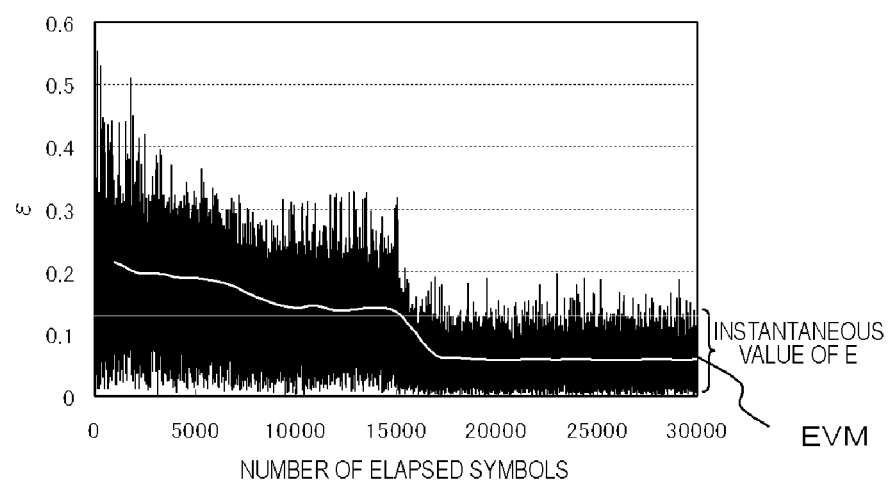
FIG. 7 is a diagram illustrating an example of a monitoring result of an error function and $EVM_{mon}$.

FIG. 7 illustrates an example of a monitoring result of the error function and the $EVM_{mon}$. The transverse axis expresses the number of elapsed symbols and corresponds to time. The longitudinal axis expresses an instantaneous value of the error function ϵ for each symbol and a transition of the $EVM_{mon}$ which is calculated every 1000 symbols.

The selection unit 183 initially selects a symbol determination performed by the symbol rough-determination unit 182. It can be seen that the $EVM_{mon}$ is stabilized at about 0.15 when about 1000 symbols have elapsed, and thus pre-convergence is completed. Thereafter, the selection unit 183 outputs a symbol determination performed by the symbol determination unit 181 at the time of about 15000 symbols. As a result, it can be seen that the EVM is stabilized at about 0.05 around 17000 symbols, the DD algorithm converges, and polarized wave separation is completed.

As described above, according to the present embodiment, even if a filter coefficient is started from any initial value, the filter coefficient can be made to easily converge. In addition, the first error calculation unit 172 sets a filter coefficient by using the decision directed algorithm, and thus has high tracking performance to polarization rotation.

Second Embodiment

Figure 8:
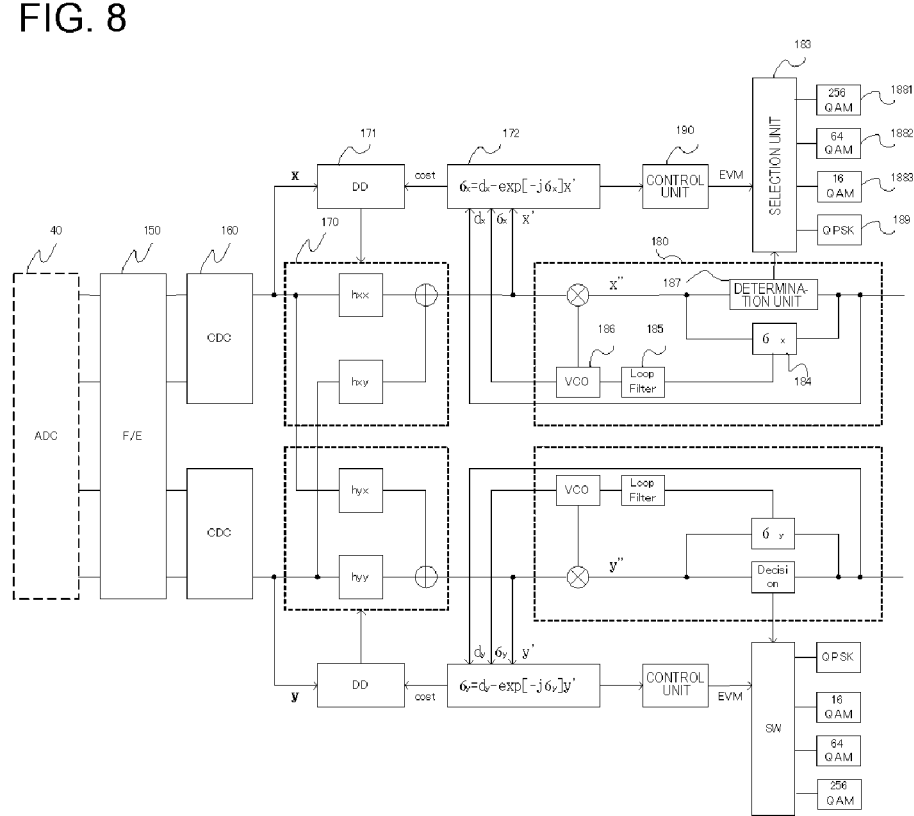
FIG. 8 is a block diagram illustrating a configuration of a signal processing device according to a second embodiment.

FIG. 8 is a block diagram illustrating a configuration of a signal processing device 100 according to a second embodiment. The signal processing device 100 according to the present embodiment has the same configuration as the signal processing device 100 according to the first embodiment except for the following.

First, each of the carrier compensation sections 180 is not provided with the symbol determination unit 181, the symbol rough-determination unit 182, and the selection unit 183. Alternatively, each of the carrier compensation sections 180 includes a region determination unit 187. The region determination units 187 perform symbol determination on the carrier compensated signals x" and y" on the basis of determination reference data. The determination reference data used by the region determination units 187 is stored in symbol determination data storage units 188 and symbol rough-determination data storage units 189.

The region determination units 187 examine in which region of an IQ constellation the carrier compensated signals x" and y" are present. FIG. 9 illustrates a region determination image. The region determination units 187 examine whether or not the carrier compensated signals x" and y" are present in each of 256 regions which are divided by the dotted lines of FIG. 9, and output IDs of regions where the carrier compensated signals are present. As for the ID, there are 16 values as $ID_I$ in the I axis direction, and there are 16 values as $ID_Q$ in the Q axis direction, and 256 values are provided by combination of $ID_I$ and $ID_Q$. The dotted line indicates a threshold value for determining a region, and is a line which connects intermediate values of coordinates of respective ideal symbols in which 256QAM signals are adjacent to each other. When coordinates of four corners of a symbol arrangement of 256QAM are respectively set to [+a,+a], [−a,+a], [−a,−a], and [+a,−a], region determination threshold values are 0, ±2a/15, ±4a/15, ±6a/15, ±8a/15, ±10a/15, ±12a/15, and ±14a/15.

In addition, the signal processing device 100 includes the symbol determination data storage units 1881 to 1883. The symbol determination data storage units 1881 to 1883 store data (for example, a reference table) for performing the symbol determination on the carrier compensated signals x″ and y″ on the basis of a standard of signal light input to the 90° optical hybrid 20, access the reference table in accordance with IDs output from the region determination units 187 so as to acquire corresponding to symbol arrangements, and output the symbol arrangements as determination results.

Figure 10:
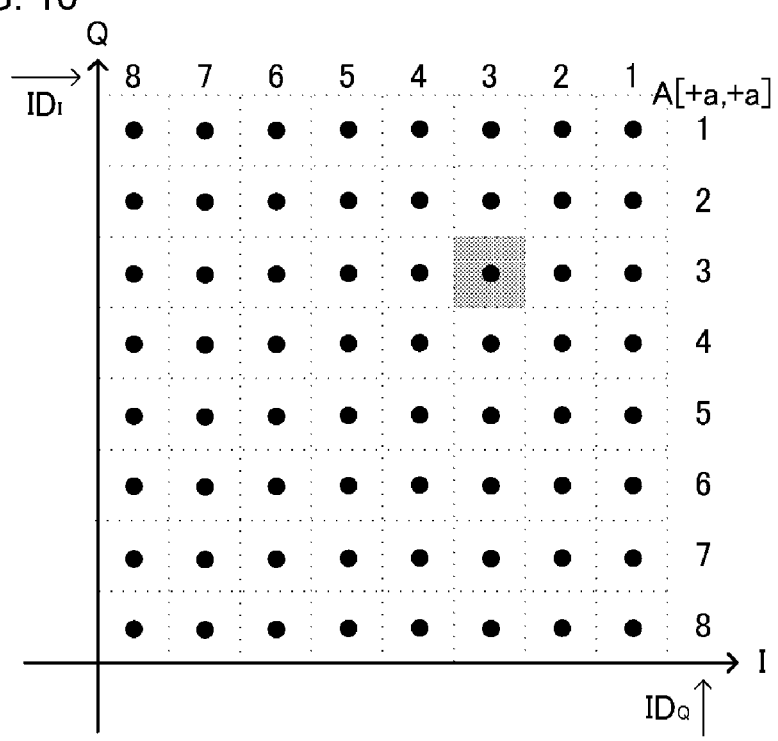
FIG. 10 is a diagram illustrating a symbol arrangement of 256QAM signals.

FIG. 10 is a diagram illustrating only a first quadrant of a symbol arrangement stored in the symbol determination data storage unit 1881 in a case where a standard of an optical signal input to the 90° optical hybrid 20 is 256QAM. When, among four corners of the symbol arrangement of 256QAM, a coordinate of the corner of the first quadrant is set to A[+a,+a], a symbol arrangement reference table of 256QAM is illustrated in Tables 1 and 2 only in relation to the first quadrant.

TABLE 1

Ideal symbol arrangement of 256QAM (1)

| | | Region ($ID_I$) | | | |
|---|---|---|---|---|---|
| Region ($ID_Q$) | ... | (4) $+\frac{8}{15}a \leq I < +\frac{10}{15}a$ | (3) $+\frac{10}{15}a \leq I < +\frac{12}{15}a$ | (2) $+\frac{12}{15}a \leq I < +\frac{14}{15}a$ | (1) $+\frac{14}{15}a \leq I \leq +\infty$ |
| (1) $+\frac{14}{15}a \leq Q \leq \infty$ | | $[+\frac{9}{15}a, +\frac{15}{15}a]$ | $[+\frac{11}{15}a, +\frac{15}{15}a]$ | $[+\frac{13}{15}a, +\frac{15}{15}a]$ | $[+\frac{15}{15}a, +\frac{15}{15}a]$ |
| (2) $+\frac{12}{15}a \leq Q < +\frac{14}{15}a$ | | $[+\frac{9}{15}a, +\frac{13}{15}a]$ | $[+\frac{11}{15}a, +\frac{13}{15}a]$ | $[+\frac{13}{15}a, +\frac{13}{15}a]$ | $[+\frac{15}{15}a, +\frac{13}{15}a]$ |
| (3) $+\frac{10}{15}a \leq Q < +\frac{12}{15}a$ | | $[+\frac{9}{15}a, +\frac{11}{15}a]$ | $[+\frac{11}{15}a, +\frac{11}{15}a]$ | $[+\frac{13}{15}a, +\frac{11}{15}a]$ | $[+\frac{15}{15}a, +\frac{11}{15}a]$ |
| (4) $+\frac{8}{15}a \leq Q < +\frac{10}{15}a$ | | $[+\frac{9}{15}a, +\frac{9}{15}a]$ | $[+\frac{11}{15}a, +\frac{9}{15}a]$ | $[+\frac{13}{15}a, +\frac{9}{15}a]$ | $[+\frac{15}{15}a, +\frac{9}{15}a]$ |
| (5) $+\frac{6}{15}a \leq Q < +\frac{8}{15}a$ | | $[+\frac{9}{15}a, +\frac{7}{15}a]$ | $[+\frac{11}{15}a, +\frac{7}{15}a]$ | $[+\frac{13}{15}a, +\frac{7}{15}a]$ | $[+\frac{15}{15}a, +\frac{7}{15}a]$ |
| (6) $+\frac{4}{15}a \leq Q < +\frac{6}{15}a$ | | $[+\frac{9}{15}a, +\frac{5}{15}a]$ | $[+\frac{11}{15}a, +\frac{5}{15}a]$ | $[+\frac{13}{15}a, +\frac{5}{15}a]$ | $[+\frac{15}{15}a, +\frac{5}{15}a]$ |
| (7) $+\frac{2}{15}a \leq Q < +\frac{4}{15}a$ | | $[+\frac{9}{15}a, +\frac{3}{15}a]$ | $[+\frac{11}{15}a, +\frac{3}{15}a]$ | $[+\frac{13}{15}a, +\frac{3}{15}a]$ | $[+\frac{15}{15}a, +\frac{3}{15}a]$ |
| (8) $0 \leq Q < +\frac{2}{15}a$ | | $[+\frac{9}{15}a, +\frac{1}{15}a]$ | $[+\frac{11}{15}a, +\frac{1}{15}a]$ | $[+\frac{13}{15}a, +\frac{1}{15}a]$ | $[+\frac{15}{15}a, +\frac{1}{15}a]$ |

TABLE 2

Ideal symbol arrangement of 256QAM (2)

| | Region ($ID_I$) | | | | |
|---|---|---|---|---|---|
| Region ($ID_Q$) | (8) $0 \leq I < +\frac{2}{15}a$ | (7) $+\frac{2}{15}a \leq I < +\frac{4}{15}a$ | (6) $+\frac{4}{15}a \leq I < +\frac{6}{15}a$ | (5) $+\frac{6}{15}a \leq I < +\frac{8}{15}a$ | ... |
| (1) $+\frac{14}{15}a \leq Q \leq \infty$ | $[+\frac{1}{15}a, +\frac{15}{15}a]$ | $[+\frac{3}{15}a, +\frac{15}{15}a]$ | $[+\frac{5}{15}a, +\frac{15}{15}a]$ | $[+\frac{7}{15}a, +\frac{15}{15}a]$ | |
| (2) $+\frac{12}{15}a \leq Q < +\frac{14}{15}a$ | $[+\frac{1}{15}a, +\frac{13}{15}a]$ | $[+\frac{3}{15}a, +\frac{13}{15}a]$ | $[+\frac{5}{15}a, +\frac{13}{15}a]$ | $[+\frac{7}{15}a, +\frac{13}{15}a]$ | |

TABLE 2-continued

Ideal symbol arrangement of 256QAM (2)

| | Region ($ID_I$) | | | |
|---|---|---|---|---|
| Region ($ID_Q$) | (8) $0 \leq I < +\frac{2}{15}a$ | (7) $+\frac{2}{15}a \leq I < +\frac{4}{15}a$ | (6) $+\frac{4}{15}a \leq I < +\frac{6}{15}a$ | (5) $+\frac{6}{15}a \leq I < +\frac{8}{15}a$ ... |
| (3) $+\frac{10}{15}a \leq Q < +\frac{12}{15}a$ | $[+\frac{1}{15}a, +\frac{11}{15}a]$ | $[+\frac{3}{15}a, +\frac{11}{15}a]$ | $[+\frac{5}{15}a, +\frac{11}{15}a]$ | $[+\frac{7}{15}a, +\frac{11}{15}a]$ |
| (4) $+\frac{8}{15}a \leq Q < +\frac{10}{15}a$ | $[+\frac{1}{15}a, +\frac{9}{15}a]$ | $[+\frac{3}{15}a, +\frac{9}{15}a]$ | $[+\frac{5}{15}a, +\frac{9}{15}a]$ | $[+\frac{7}{15}a, +\frac{9}{15}a]$ |
| (5) $+\frac{6}{15}a \leq Q < +\frac{8}{15}a$ | $[+\frac{1}{15}a, +\frac{7}{15}a]$ | $[+\frac{3}{15}a, +\frac{7}{15}a]$ | $[+\frac{5}{15}a, +\frac{7}{15}a]$ | $[+\frac{7}{15}a, +\frac{7}{15}a]$ |
| (6) $+\frac{4}{15}a \leq Q < +\frac{6}{15}a$ | $[+\frac{1}{15}a, +\frac{5}{15}a]$ | $[+\frac{3}{15}a, +\frac{5}{15}a]$ | $[+\frac{5}{15}a, +\frac{5}{15}a]$ | $[+\frac{7}{15}a, +\frac{5}{15}a]$ |
| (7) $+\frac{2}{15}a \leq Q < +\frac{4}{15}a$ | $[+\frac{1}{15}a, +\frac{3}{15}a]$ | $[+\frac{3}{15}a, +\frac{3}{15}a]$ | $[+\frac{5}{15}a, +\frac{3}{15}a]$ | $[+\frac{7}{15}a, +\frac{3}{15}a]$ |
| (8) $0 \leq Q < +\frac{2}{15}a$ | $[+\frac{1}{15}a, +\frac{1}{15}a]$ | $[+\frac{3}{15}a, +\frac{1}{15}a]$ | $[+\frac{5}{15}a, +\frac{1}{15}a]$ | $[+\frac{7}{15}a, +\frac{1}{15}a]$ |

The first row and the first column of Tables 1 and 2 respectively correspond to $ID_I$ and $ID_Q$. For example, when the carrier compensated signal x" or y" is present in the hatched region of FIG. 10, the region determination unit 187 outputs an ID of "33". The symbol determination data storage unit 1881 outputs a coordinate [+11a/15,+11a/15] written in a cell of $ID_I$=3 and $ID_Q$=3 of Table 1 (the hatched cell in Table 1), as a determination result.

Figure 11:
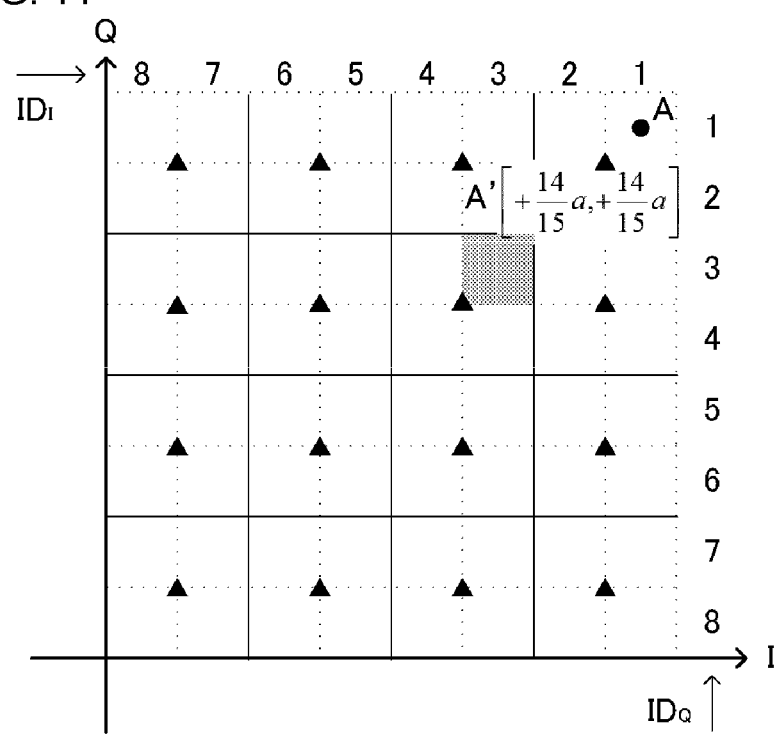
FIG. 11 is a diagram illustrating a symbol arrangement of 64QAM signals.

FIG. 11 is a diagram illustrating only a first quadrant of a symbol arrangement stored in the symbol determination data storage unit 1882 in a case where a standard of an optical signal input to the 90° optical hybrid 20 is 64QAM. When a coordinate of the corner of the first quadrant among four corners of the symbol arrangement of 256QAM is set to A[+a,+a], a coordinate of a corner of the first quadrant among four corners of a symbol arrangement of 64QAM is set to A'[+14a/15,+14a/15]. A symbol arrangement reference table of 64QAM is illustrated in Tables 3 and 4 only in relation to the first quadrant.

TABLE 3

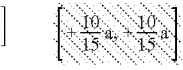

TABLE 3-continued

Ideal symbol arrangement of 64QAM (2)

| | ID (I axis) | | | | |
|---|---|---|---|---|---|
| ID (Q axis) | ... | (4) $+\frac{8}{15} \le I < +\frac{10}{15}a$ | (3) $+\frac{10}{15}a \le I < +\frac{12}{15}a$ | (2) $+\frac{12}{15}a \le I < +\frac{14}{15}a$ | (1) $+\frac{14}{15}a \le I \le +\infty$ |
| (5) $+\frac{6}{15}a \le Q < +\frac{8}{15}a$ | | $\left[+\frac{10}{15}a, +\frac{6}{15}a\right]$ | $\left[+\frac{10}{15}a, +\frac{6}{15}a\right]$ | $\left[+\frac{14}{15}a, +\frac{6}{15}a\right]$ | $\left[+\frac{14}{15}a, +\frac{6}{15}a\right]$ |
| (6) $+\frac{4}{15}a \le Q < +\frac{16}{15}a$ | | $\left[+\frac{10}{15}a, +\frac{6}{15}a\right]$ | $\left[+\frac{10}{15}a, +\frac{6}{15}a\right]$ | $\left[+\frac{14}{15}a, +\frac{6}{15}a\right]$ | $\left[+\frac{14}{15}a, +\frac{6}{15}a\right]$ |
| (7) $+\frac{2}{15}a \le Q < +\frac{4}{15}a$ | | $\left[+\frac{10}{15}a, +\frac{2}{15}a\right]$ | $\left[+\frac{10}{15}a, +\frac{2}{15}a\right]$ | $\left[+\frac{14}{15}a, +\frac{2}{15}a\right]$ | $\left[+\frac{14}{15}a, +\frac{2}{15}a\right]$ |
| (8) $0 < Q < +\frac{2}{15}a$ | | $\left[+\frac{10}{15}a, +\frac{2}{15}a\right]$ | $\left[+\frac{10}{15}a, +\frac{2}{15}a\right]$ | $\left[+\frac{14}{15}a, +\frac{2}{15}a\right]$ | $\left[+\frac{14}{15}a, +\frac{2}{15}a\right]$ |

TABLE 4

Ideal symbol arrangement of 64QAM (2)

| | ID (I axis) | | | | |
|---|---|---|---|---|---|
| ID (Q axis) | (8) $0 \le I < +\frac{2}{15}a$ | (7) $+\frac{2}{15}a \le I < +\frac{4}{15}a$ | (6) $+\frac{4}{15}a \le I < +\frac{6}{15}a$ | (5) $+\frac{6}{15}a \le I < +\frac{8}{15}a$ | ... |
| (1) $+\frac{14}{15}a \le Q \le \infty$ | $\left[+\frac{2}{15}a, +\frac{14}{15}a\right]$ | $\left[+\frac{2}{15}a, +\frac{14}{15}a\right]$ | $\left[+\frac{6}{15}a, +\frac{14}{15}a\right]$ | $\left[+\frac{6}{15}a, +\frac{14}{15}a\right]$ | |
| (2) $+\frac{12}{15}a \le Q < +\frac{14}{15}a$ | $\left[+\frac{2}{15}a, +\frac{14}{15}a\right]$ | $\left[+\frac{2}{15}a, +\frac{14}{15}a\right]$ | $\left[+\frac{6}{15}a, +\frac{14}{15}a\right]$ | $\left[+\frac{6}{15}a, +\frac{14}{15}a\right]$ | |
| (3) $+\frac{10}{15}a \le Q < +\frac{12}{15}a$ | $\left[+\frac{2}{15}a, +\frac{10}{15}a\right]$ | $\left[+\frac{2}{15}a, +\frac{10}{15}a\right]$ | $\left[+\frac{6}{15}a, +\frac{10}{15}a\right]$ | $\left[+\frac{6}{15}a, +\frac{10}{15}a\right]$ | |
| (4) $+\frac{8}{15}a \le Q < +\frac{10}{15}a$ | $\left[+\frac{2}{15}a, +\frac{10}{15}a\right]$ | $\left[+\frac{2}{15}a, +\frac{10}{15}a\right]$ | $\left[+\frac{6}{15}a, +\frac{10}{15}a\right]$ | $\left[+\frac{6}{15}a, +\frac{10}{15}a\right]$ | |
| (5) $+\frac{6}{15}a \le Q < +\frac{14}{15}a$ | $\left[+\frac{2}{15}a, +\frac{6}{15}a\right]$ | $\left[+\frac{2}{15}a, +\frac{6}{15}a\right]$ | $\left[+\frac{6}{15}a, +\frac{6}{15}a\right]$ | $\left[+\frac{6}{15}a, +\frac{6}{15}a\right]$ | |
| (6) $+\frac{4}{15}a \le Q < +\frac{6}{15}a$ | $\left[+\frac{2}{15}a, +\frac{6}{15}a\right]$ | $\left[+\frac{2}{15}a, +\frac{6}{15}a\right]$ | $\left[+\frac{6}{15}a, +\frac{6}{15}a\right]$ | $\left[+\frac{6}{15}a, +\frac{6}{15}a\right]$ | |
| (7) $+\frac{2}{15}a \le Q < +\frac{4}{15}a$ | $\left[+\frac{2}{15}a, +\frac{2}{15}a\right]$ | $\left[+\frac{2}{15}a, +\frac{2}{15}a\right]$ | $\left[+\frac{6}{15}a, +\frac{2}{15}a\right]$ | $\left[+\frac{6}{15}a, +\frac{2}{15}a\right]$ | |
| (8) $0 \le Q < +\frac{2}{15}a$ | $\left[+\frac{2}{15}a, +\frac{2}{15}a\right]$ | $\left[+\frac{2}{15}a, +\frac{2}{15}a\right]$ | $\left[+\frac{6}{15}a, +\frac{2}{15}a\right]$ | $\left[+\frac{6}{15}a, +\frac{2}{15}a\right]$ | |

The first row and the first column of Tables 3 and 4 respectively correspond to $ID_I$ and $ID_Q$. For example, when the carrier compensated signal x" or y" is present in the hatched region of FIG. 11, the region determination unit 187 outputs an ID of "33". The symbol determination data storage unit 1882 outputs a coordinate [+10a/15,+10a/15] written in a cell of $ID_I=3$ and $ID_Q=3$ of Table 3 (the hatched cell in Table 3), as a determination result.

Figure 12:
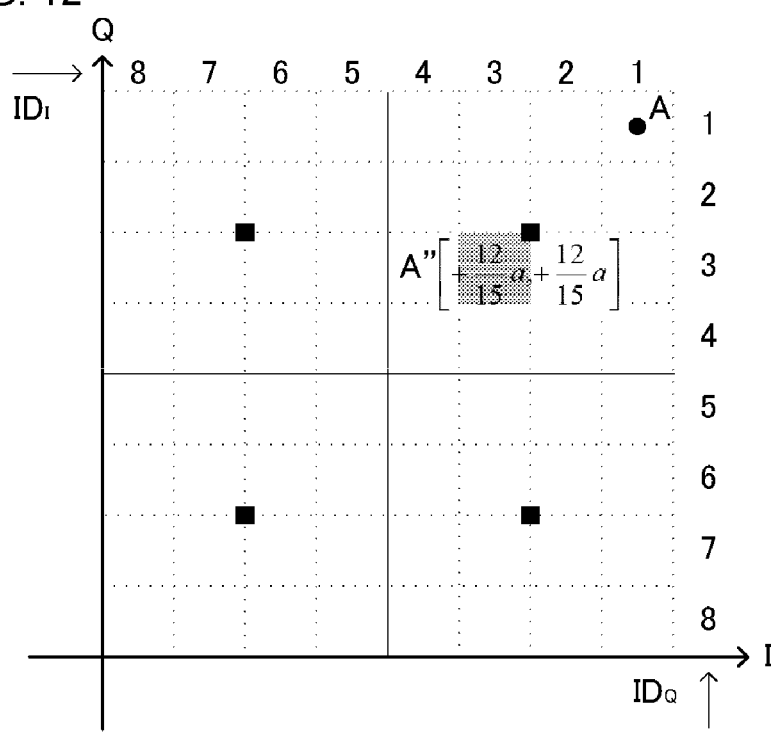
FIG. 12 is a diagram illustrating a symbol arrangement of 16QAM signals.

FIG. 12 is a diagram illustrating only a first quadrant of a symbol arrangement stored in the symbol determination data storage unit 1883 in a case where a standard of an optical signal input to the 90° optical hybrid 20 is 16QAM. When a coordinate of the corner of the first quadrant among four corners of the symbol arrangement of 256QAM is set to A[+a,+a], a coordinate of a corner of the first quadrant among four corners of a symbol arrangement of 16QAM is set to A″[+12a/15,+12a/15]. A symbol arrangement reference table of 16QAM is illustrated in Tables 5 and 6 only in relation to the first quadrant.

TABLE 5

Ideal symbol arrangement of 16QAM (1)

| | | ID (I axis) | | | |
|---|---|---|---|---|---|
| ID (Q axis) | ... | (4) $+\frac{8}{15}a \leq I < +\frac{10}{15}a$ | (3) $+\frac{10}{15}a \leq I < +\frac{12}{15}a$ | (2) $+\frac{12}{15}a \leq I < +\frac{14}{15}a$ | (1) $+\frac{14}{15}a \leq I \leq +\infty$ |
| (1) $+\frac{14}{15}a \leq Q \leq \infty$ | | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ |
| (2) $+\frac{12}{15}a \leq Q < +\frac{14}{15}a$ | | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ |
| (3) $+\frac{10}{15}a \leq Q < +\frac{12}{15}a$ | | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ |
| (4) $+\frac{8}{15}a \leq Q < +\frac{10}{15}a$ | | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ | $\left[+\frac{12}{15}a, +\frac{12}{15}a\right]$ |
| (5) $+\frac{6}{15}a \leq Q < +\frac{8}{15}a$ | | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ |
| (6) $+\frac{4}{15}a \leq Q < +\frac{6}{15}a$ | | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ |
| (7) $+\frac{2}{15}a \leq Q < +\frac{4}{15}a$ | | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ |
| (8) $0 \leq Q < +\frac{2}{15}a$ | | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ | $\left[+\frac{12}{15}a, +\frac{4}{15}a\right]$ |

TABLE 6

Ideal symbol arrangement of 16QAM (2)

| | ID (I axis) | | | | |
|---|---|---|---|---|---|
| ID (Q axis) | (8) $0 \leq I < +\frac{2}{15}a$ | (7) $+\frac{2}{15}a \leq I < +\frac{4}{15}a$ | (6) $+\frac{4}{15}a \leq I < +\frac{6}{15}a$ | (5) $+\frac{6}{15}a \leq I < +\frac{8}{15}a$ | ... |
| (1) $+\frac{14}{15}a \leq Q \leq \infty$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | |
| (2) $+\frac{12}{15}a \leq Q < +\frac{14}{15}a$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | |
| (3) $+\frac{10}{15}a \leq Q < +\frac{12}{15}a$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | |
| (4) $+\frac{8}{15}a \leq Q < +\frac{10}{15}a$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | $\left[+\frac{4}{15}a, +\frac{12}{15}a\right]$ | |

TABLE 6-continued

Ideal symbol arrangement of 16QAM (2)

| | ID (I axis) | | | |
|---|---|---|---|---|
| ID (Q axis) | (8) $0 \leq I < +\frac{2}{15}a$ | (7) $+\frac{2}{15}a \leq I < +\frac{4}{15}a$ | (6) $+\frac{4}{15}a \leq I < +\frac{6}{15}a$ | (5) $+\frac{6}{15}a \leq I < +\frac{8}{15}a$ ... |
| (5) $+\frac{6}{15}a \leq Q < +\frac{8}{15}a$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ |
| (6) $+\frac{4}{15}a \leq Q < +\frac{6}{15}a$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ |
| (7) $+\frac{2}{15}a \leq Q < +\frac{4}{15}a$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ |
| (8) $0 \leq Q < +\frac{2}{15}a$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ | $\left[+\frac{4}{15}a, +\frac{4}{15}a\right]$ |

The first row and the first column of Tables 5 and 6 respectively correspond to $ID_I$ and $ID_Q$. For example, when the carrier compensated signal x" or y" is present in the hatched region of FIG. 12, the region determination unit 187 outputs an ID of "33". The symbol determination data storage unit 1883 outputs a coordinate [+12a/15,+12a/15] written in a cell of $ID_I$=3 and $ID_Q$=3 of Table 5 (the hatched cell in Table 5), as a determination result.

Figure 13:
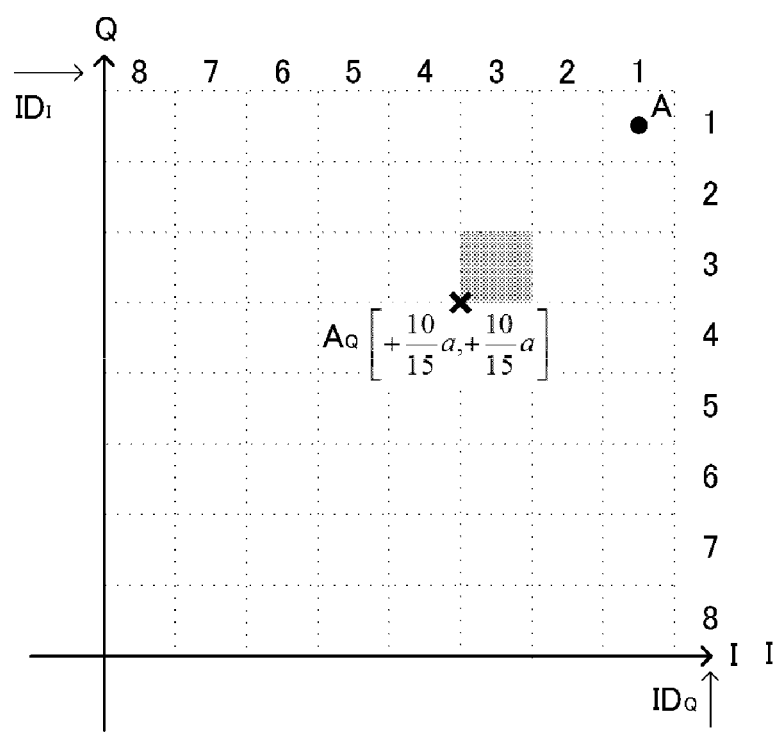
FIG. 13 is a diagram illustrating a symbol arrangement of QPSK signals.

FIG. 13 is a diagram illustrating only a first quadrant of a symbol arrangement stored in the symbol rough-determination data storage unit 189. When a coordinate of the corner of the first quadrant among four corners of the symbol arrangement of 256QAM is set to A[+a,+a], a coordinate of a corner of the first quadrant among four corners of a symbol arrangement of QPSK is set to $A_Q$[+10a/15,+10a/15]. A symbol arrangement reference table of QPSK is illustrated in Tables 7 and 8 only in relation to the first quadrant.

TABLE 7

Ideal symbol arrangement of QPSK (1)

| | ID (I axis) | | | |
|---|---|---|---|---|
| ID (Q axis) | (4) $+\frac{8}{15}a \leq I < +\frac{10}{15}a$ | (3) $+\frac{10}{15}a \leq I < +\frac{12}{15}a$ | (2) $+\frac{12}{15}a \leq I < +\frac{14}{15}a$ | (1) $+\frac{14}{15}a \leq I \leq +\infty$ |
| (1) $+\frac{14}{15}a \leq Q \leq \infty$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (2) $+\frac{12}{15}a \leq Q < +\frac{14}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (3) $+\frac{10}{15}a \leq Q < +\frac{12}{15}a$ | $\left[\pm\frac{10}{15}a, +\frac{10}{15}a\right]$ | $\left[+\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (4) $+\frac{8}{15}a \leq Q < +\frac{10}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (5) $+\frac{6}{15}a \leq Q < +\frac{8}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (6) $+\frac{4}{15}a \leq Q < +\frac{6}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |

TABLE 7-continued

Ideal symbol arrangement of QPSK (1)

| | | ID (I axis) | | | |
|---|---|---|---|---|---|
| ID (Q axis) | | (4) $+\frac{8}{15} \le I < +\frac{10}{15}a$ | (3) $+\frac{10}{15}a \le I < +\frac{12}{15}a$ | (2) $+\frac{12}{15}a \le I < +\frac{14}{15}a$ | (1) $+\frac{14}{15}a \le I \le +\infty$ |
| (7) $+\frac{2}{15}a \le Q < +\frac{4}{15}a$ | ... | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |
| (8) $0 \le Q < +\frac{2}{15}a$ | | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ |

TABLE 8

Ideal symbol arrangement of QPSK

| | ID (I axis) | | | | |
|---|---|---|---|---|---|
| ID (Q axis) | (8) $0 \le I < +\frac{2}{15}a$ | (7) $+\frac{2}{15}a \le I < +\frac{4}{15}a$ | (6) $+\frac{4}{15}a \le I < +\frac{6}{15}a$ | (5) $+\frac{6}{15}a \le I < +\frac{8}{15}a$ | |
| (1) $+\frac{14}{15}a \le Q \le \infty$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (2) $+\frac{12}{15}a \le Q < +\frac{14}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (3) $+\frac{10}{15}a \le Q < +\frac{12}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (4) $+\frac{8}{15}a \le Q < +\frac{10}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (5) $+\frac{6}{15}a \le Q < +\frac{8}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (6) $+\frac{4}{15}a \le Q < +\frac{6}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (7) $+\frac{2}{15}a \le Q < +\frac{4}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |
| (8) $0 \le Q < +\frac{2}{15}a$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | $\left[\pm\frac{10}{15}a, +\frac{10}{15}a\right]$ | |

The first row and the first column of Tables 7 and 8 respectively correspond to $ID_I$ and $ID_Q$. For example, when the carrier compensated signal x″ or y″ is present in the hatched region of FIG. 13, the region determination unit 187 outputs an ID of "33". The symbol rough-determination data storage unit 189 outputs a coordinate [+10a/15,+10a/15] written in a cell of $TD_I$=3 and $ID_Q$=3 of Table 7 (the hatched cell in Table 7), as a determination result.

Figure 14:
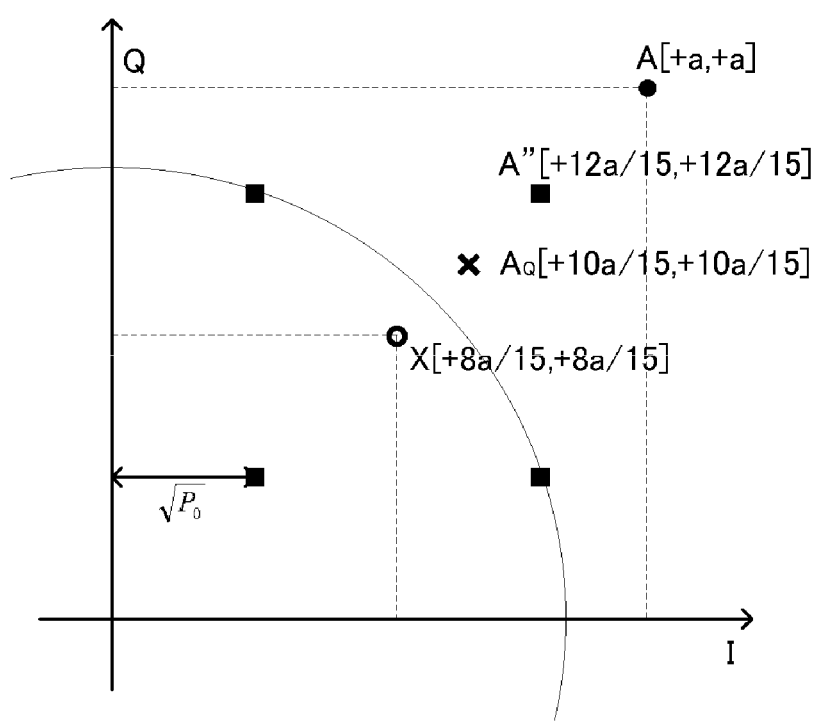
FIG. 14 is a diagram illustrating symbol rough-determination of 16QAM signals.

FIG. 14 is a diagram illustrating a symbol rough-determination of 16QAM signals. A central coordinate of four symbols of 16QAM signals present in the first quadrant is X[+8a/15,+8a/15], and a distance thereof from the origin is 0.754a. In addition, an average power P of the 16QAM signals is obtained as follows.

$$P = (2/3) \times (M - 1) \times P_0$$
$$= (2/3) \times (16 - 1) \times (4a/15)^2$$
$$= 34a^2/45$$

Further, the distance from the origin is 0.843a. In this case, a point which is symmetrical to the central coordinate X with respect to the average power has a distance of 0.932a from the origin, and thus a closest point in the symbol arrangement of 256QAM has a coordinate of $A_Q$ [+10a/15,+10a/15].

Figure 15:
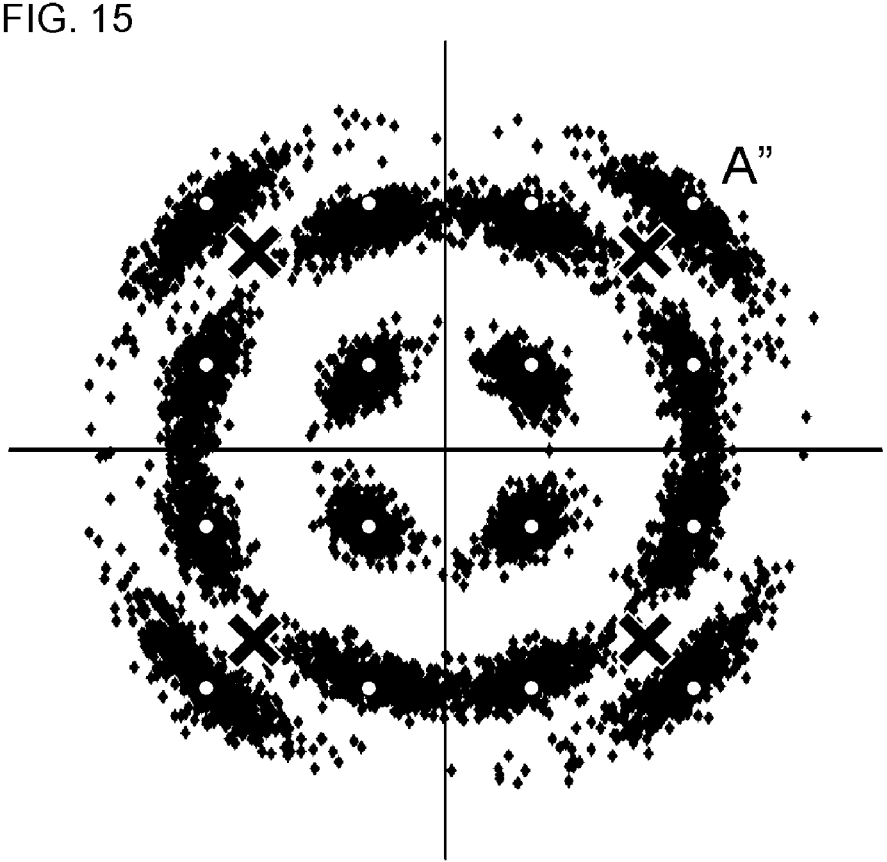
FIG. 15 is a diagram illustrating a constellation of carrier compensated signals x" and y" of 16QAM signals.

FIG. 15 illustrates a constellation of the carrier compensated signals x" and y" of 16QAM signals in a case where the selection units 183 select the symbol rough-determination data storage units 189, and filter coefficients converge to an extent. As illustrated in FIG. 15, even if the selection units 183 select the symbol rough-determination data storage units 189, the carrier compensated signals x" and y" do not lose characteristics based on the 16QAM signals. In addition, the coordinate $A_Q$ of QPSK is used as symbol rough-determination data, and thus the constellation of the carrier compensated signals x" and y" has substantially the same coordinate positions as in the symbol arrangement of the 16QAM signals illustrated in FIG. 12. Therefore, among the symbols at the four corners of the 16QAM signals, a coordinate of the symbol at the corner of the first quadrant is a position of A"[+12a/15,+12a/15].

Further, if the filter coefficients converge to an extent (the EVM becomes smaller than the predetermined threshold value), the selection unit 183 selects a symbol determination result performed by the symbol determination unit 181. Accordingly, the filter coefficients calculated by the coefficient calculation unit 171 further converge, and thus a result illustrated in FIG. 16 can be obtained. For this reason, the symbol determination unit 181 can perform a symbol determination with high accuracy.

Figure 16:
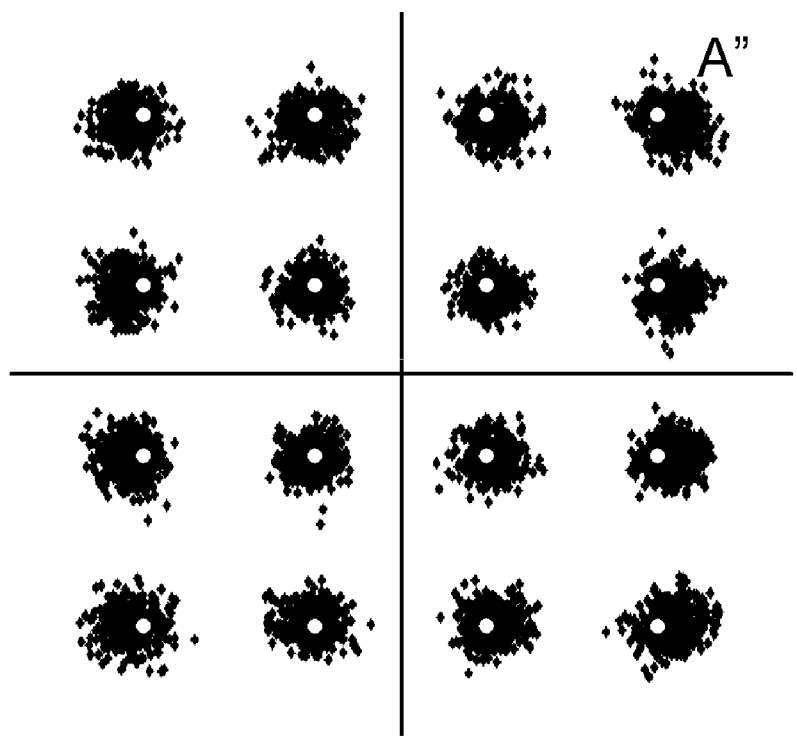
FIG. 16 is a diagram illustrating an example of a determination result of 64QAM signals performed by the symbol determination unit.

FIGS. 15 and 16 have substantially the same coordinate positions as each other, and thus the $EVM_{mon}$ in the symbol rough-determination and the $EVM_{mon}$ in the symbol determination have the same scale as each other. Therefore, a difference in the EVM is easily calculated, and it becomes easier to determine convergence than in the first embodiment.

Figure 17:
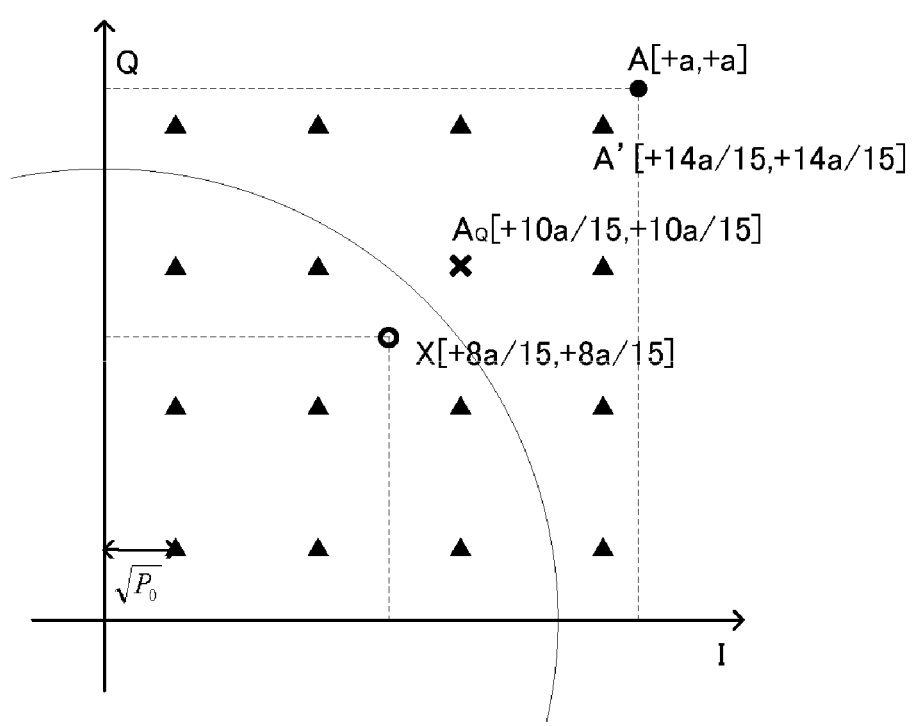
FIG. 17 is a diagram illustrating symbol rough-determination of 64QAM signals.

FIG. 17 is a diagram illustrating a symbol rough-determination of 64QAM signals. A central coordinate of four symbols of 64QAM signals present in the first quadrant is X[+8a/15,+8a/15], and a distance thereof from the origin is 0.754a. In addition, an average power of the 64QAM signals is obtained as follows.

$$P = (2/3) \times (M - 1) \times P_0$$
$$= (2/3) \times (64 - 1) \times (2a/15)^2$$
$$= 56a^2/75$$

Further, the distance from the origin is 0.8641a. In this case, a point which is symmetrical to the central coordinate X with respect to the average power has a distance of 0.9742a from the origin, and thus a closest point in the symbol arrangement of 256QAM has a coordinate of $A_Q$[+10a/15,+10a/15].

In the same manner as in the case of the 16QAM signals, the coordinate $A_Q$ of QPSK is used as symbol rough-determination data, and thus the constellation of the carrier compensated signals x" and y" of 64QAM signals has substantially the same coordinate positions as in the symbol arrangement of the 64QAM signals illustrated in FIG. 11. Therefore, among the symbols at the four corners of the 64QAM signals, a coordinate of the symbol at the corner of the first quadrant is a position of A'[+14a/15,+14a/15].

Figure 18:
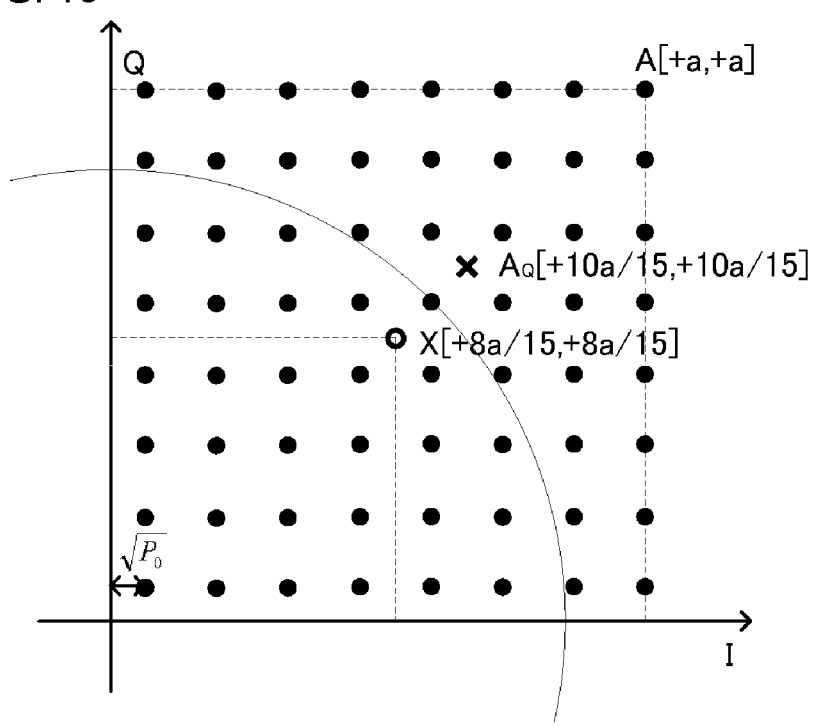
FIG. 18 is a diagram illustrating symbol rough-determination of 256QAM signals.

FIG. 18 is a diagram illustrating a symbol rough-determination of 256QAM signals. A central coordinate of four symbols of 256QAM signals present in the first quadrant is X[+8a/15,+8a/15], and a distance thereof from the origin is 0.754a. In addition, an average power of the 256QAM signals is obtained as follows.

$$P = (2/3) \times (M - 1) \times P_0$$
$$= (2/3) \times (256 - 1) \times (a/15)^2$$
$$= 34a^2/45$$

Further, the distance from the origin is 0.8692a. In this case, a point which is symmetrical to the central coordinate X with respect to the average power has a distance of 0.9844a from the origin, and thus a closest point in the symbol arrangement of 256QAM has a coordinate of $A_Q$[+10a/15,+10a/15].

To summarize, at least two signal arrangements of the multi-value modulation are signal arrangements of 22n-value quadrature amplitude modulation signals and 22m-value quadrature amplitude modulation signals (where n>m). When coordinates of four corners of the symbol arrangement of the 22n-value quadrature amplitude modulation signals are respectively set to [+a,+a], [−a,+a], [−a,−a], and [+a,−a], coordinates of four corners of the symbol arrangement of the 22m-value quadrature amplitude modulation signals are respectively set to [+b,+b], [−b,+b], [−b,−b], and [+b,−b] (where a>b).

Specifically, at least two signal arrangements of the multi-value modulation are signal arrangements of 256-value quadrature amplitude modulation signals and 16-value quadrature amplitude modulation signals, and a ratio of distances between symbols of the 256-value quadrature amplitude modulation signals and the 16-value quadrature amplitude modulation signals is 1:4. In addition, in a case where at least two signal arrangements of the multi-value modulation are signal arrangements of 64-value quadrature amplitude modulation signals and 16-value quadrature amplitude modulation signals, a ratio of distances between symbols of the 64-value quadrature amplitude modulation signals and the 16-value quadrature amplitude modulation signals is 2:4. Further, a signal arrangement obtained by reducing the number of multi-values of the multi-value modulation is a signal arrangement of quadrature phase shift keying.

In addition, in a case where a signal arrangement of the multi-value modulation is the signal arrangement of the 256-value quadrature amplitude modulation signals, a ratio of distances between symbols of the 256-value quadrature amplitude modulation signals and the quadrature phase shift keying is 1:10. Further, in a case where a signal arrangement of the multi-value modulation is the signal arrangement of the 64-value quadrature amplitude modulation signals, a ratio of distances between symbols of the 64-value quadrature amplitude modulation signals and the quadrature phase shift keying is 2:10. Furthermore, in a case where a signal arrangement of the multi-value modulation is the signal arrangement of the 16-value quadrature amplitude modulation signals, a ratio of distances between symbols of the 16-value quadrature amplitude modulation signals and the quadrature phase shift keying is 4:10.

In the same manner as in the case of the 16QAM signals, the coordinate $A_Q$ of QPSK is used as symbol rough-determination data, and thus the constellation of the carrier compensated signals x" and y" of 256QAM signals has substantially the same coordinate positions as in the symbol arrangement of the 256QAM signals illustrated in FIG. 10. Therefore, among the symbols at the four corners of the 256QAM signals, a coordinate of the symbol at the corner of the first quadrant is a position of A'[+a,+a].

Therefore, the present embodiment can also achieve the same effects as the first embodiment. In addition, the configuration of the carrier compensation section 180 is further simplified and thus it becomes easier to determine convergence than in the first embodiment.

Third Embodiment

Figure 19:
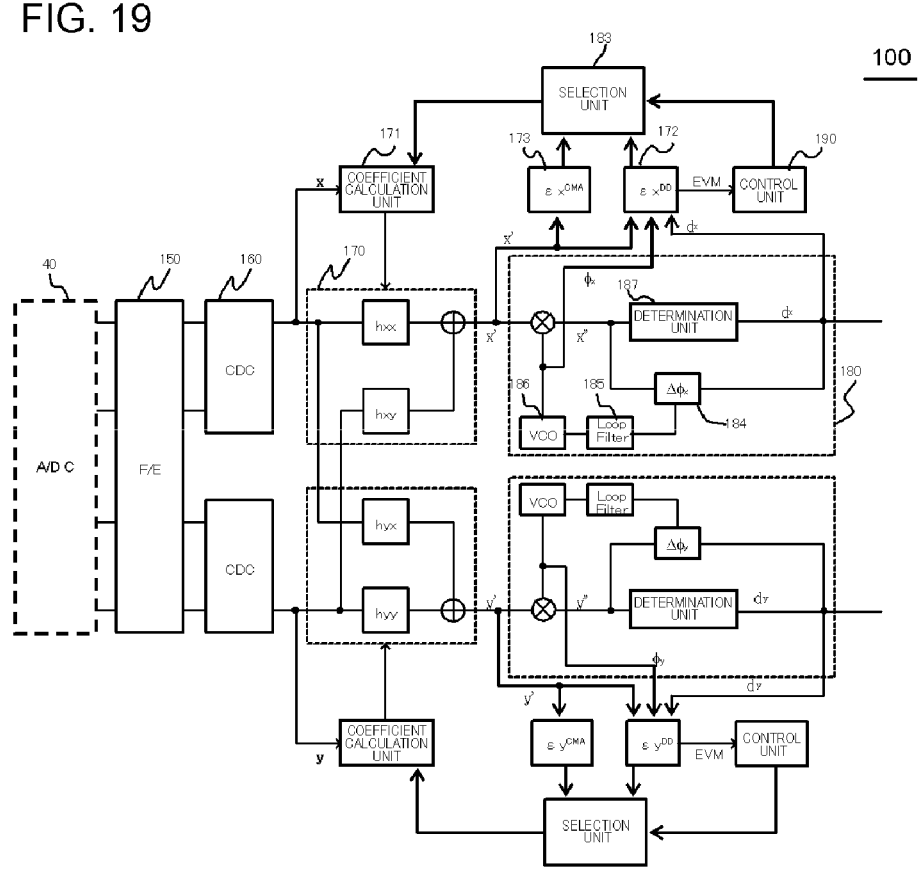
FIG. 19 is a block diagram illustrating a configuration of a signal processing device according to a third embodiment.

FIG. 19 is a block diagram illustrating a configuration of a signal processing device 100 according to a third embodiment. The signal processing device 100 according to the present embodiment has the same configuration as the signal processing device 100 according to the second embodiment except for the following.

First, in the present embodiment, the signal processing device 100 is not provided with the symbol determination data storage units 188 and the symbol rough-determination data storage units 189. In addition, the region determination units 187 perform symbol determinations on the output signals x' and y' of the polarized wave separation units 170 on the basis of a standard of a signal light input to the 90° optical hybrid 20. In other words, the region determination units 187 have the same function as the symbol determination units 181 according to the first embodiment.

In addition, the signal processing device 100 includes second error determination units 173. The second error determination unit 173 performs an error determination in a method which is simpler than the first error calculation unit 172 and does not depend on a determination result, for example, a constant modulus algorithm (CMA) method. Further, the error calculation method by the first error calculation unit 172 has higher accuracy than the error calculation method by the second error determination unit 173. The details of the CMA method are disclosed in, for example, D. N. Godard, "Self-Recovering Equalization and Carrier Tracking in Two-Dimensional Data Communication Systems", IEEE Trans. on Comm., Vol. COM-28, No. 11, pp. 1967 to 1875, November 1980.

In addition, the coefficient calculation unit 171 is connected to the first error calculation unit 172 and the second error determination unit 173 through the selection unit 183. The selection unit 183 outputs either of an error calculation result performed by the first error calculation unit 172 and an error calculation result performed by the second error determination unit 173, to the coefficient calculation unit 171. In other words, the coefficient calculation unit 171 updates filter coefficients by using either of the error calculation result performed by the first error calculation unit 172 and the error calculation result performed by the second error determination unit 173. The selection unit 183 is controlled by the control unit 190.

Details of control of the selection unit 183 performed by the control unit 190 are the same as those in the second embodiment. In other words, a timing when the selection unit 183 selects an error calculation result performed by the second error determination unit 173 is the same as a timing when the selection unit 183 according to the first embodiment selects the symbol rough-determination unit 182. In addition, a timing when the selection unit 183 selects an error calculation result performed by the first error calculation unit 172 is the same as a timing when the selection unit 183 according to the first embodiment selects the symbol determination unit 181.

The present embodiment can also achieve the same effects as the first embodiment.

As above, although the embodiments of the present invention have been described with reference to the drawings, the embodiments are only an example of the present invention, and various configurations other than the above description may be employed.

This application is based upon and claims the benefit of priority from Japanese Patent Application No. 2011-221314, filed Oct. 5, 2011, and PCT/JP2012/006323 filed Oct. 3, 2012; the entire contents of which are incorporated herein by reference.

The invention claimed is:

1. A signal processing apparatus comprising:
polarized wave separation unit for receiving four digital signals and generating two polarization signals corresponding to two polarization components of signal light from the four digital signals by using filters having filter coefficients, the four digital signals being generated by performing photoelectric conversion and analog-digital conversion on four output light beams which are generated by making the signal light having undergone polarization division multiplexing and multi-value modulation and local light interfere with each other by using a 90° optical hybrid;
carrier compensation unit for compensating for a phase difference and a frequency difference between the signal light and the local light in relation to the two polarization signals, so as to generate two carrier compensated signals;
determination unit for demodulating the two carrier compensated signals;
selection unit for selecting whether the determination unit performs the demodulation based on a signal arrangement of the multi-value modulation or based on a signal arrangement in which a number of multi-values of the multi-value modulation is reduced; and
coefficient setting unit for updating the filter coefficients of the polarized wave separation unit by using an output selected by the selection unit.

2. The signal processing apparatus according to claim 1, wherein the determination unit includes
symbol determination unit for demodulating the two carrier compensated signals based on the signal arrangement of the multi-value modulation; and
symbol rough-determination unit for demodulating the two carrier compensated signals based on the signal arrangement in which the number of multi-values of the multi-value modulation is reduced, and
wherein the selection unit selects either one of an output of the symbol determination unit and an output of the symbol rough-determination unit.

3. The signal processing apparatus according to claim 1, wherein the selection unit selects either one of first reference data for performing demodulation based on the signal arrangement of the multi-value modulation and second reference data for performing demodulation based on the signal arrangement in which the number of multi-values of the multi-value modulation is reduced, and causes the determination unit to use the selected reference data.

4. The signal processing apparatus according to claim 1, wherein the determination unit performs demodulation based on the signal arrangement of the multi-value modulation until the filter coefficients converge.

5. The signal processing apparatus according to claim 4, wherein the determination unit performs demodulation based on the signal arrangement in which the number of multi-values of the multi-value modulation is reduced after the filter coefficients converge.

6. The signal processing apparatus according to claim 4, further comprising:
error calculation unit for calculating an error of an output of the determination unit by using the two polarization signals and the output of the determination unit,
wherein the selection unit determines whether or not the filter coefficients converge by using the error calculated by the error calculation unit.

7. The signal processing apparatus according to claim 6, wherein the error calculation unit calculates an average value of the errors related to a plurality of symbols for every constant number of symbols; and
wherein the selection unit determines whether or not the filter coefficients converge by comparing the average value with a predetermined threshold value.

8. The signal processing apparatus according to claim 6, wherein the error calculation unit calculates an average value of the errors related to a plurality of symbols for every constant number of symbols; and
wherein the selection unit determines whether or not the filter coefficients converge by comparing a variation in the average value with a predetermined threshold value.

9. The signal processing apparatus according to claim 1, wherein at least two signal arrangements of the multi-value modulation are signal arrangements of $2^{2n}$-value quadrature amplitude modulation signals and $2^{2m}$-value quadrature amplitude modulation signals (where n>m), and when coordinates of four corners of the signal arrangement of the $2^{2n}$-value quadrature amplitude modulation signals are respectively set to [+a,+a], [−a,+a], [−a,−a], and [+a,−a], coordinates of four corners of the signal arrangement of the $2^{2m}$-value quadrature amplitude modulation signals are respectively set to [+b,+b], [−b,+b], [−b,−b], and [+b,−b] (where a>b).

10. The signal processing apparatus according to claim 9, wherein at least two signal arrangements of the multi-value modulation are signal arrangements of 256-value quadrature amplitude modulation signals and 16-value quadrature amplitude modulation signals, and a ratio of distances between symbols of the 256-value quadrature amplitude modulation signals and the 16-value quadrature amplitude modulation signals is 1:4.

11. The signal processing apparatus according to claim 9, wherein at least two signal arrangements of the multi-value modulation are signal arrangements of 64-value quadrature amplitude modulation signals and 16-value quadrature amplitude modulation signals, and a ratio of distances between symbols of the 64-value quadrature amplitude modulation signals and the 16-value quadrature amplitude modulation signals is 2:4.

12. The signal processing apparatus according to claim 1, wherein the signal arrangement in which the number of multi-values is reduced is a signal arrangement of quadrature phase shift keying.

13. The signal processing apparatus according to claim 1, wherein a signal arrangement of the multi-value modulation is the signal arrangement of the 256-value quadrature amplitude modulation signals, and a ratio of distances between symbols of the 256-value quadrature amplitude modulation signals and the quadrature phase shift keying is 1:10.

14. The signal processing apparatus according to claim 1, wherein a signal arrangement of the multi-value modulation is the signal arrangement of the 64-value quadrature amplitude modulation signals, and a ratio of distances between symbols of the 64-value quadrature amplitude modulation signals and the quadrature phase shift keying is 2:10.

15. The signal processing apparatus according to claim 1, wherein a signal arrangement of the multi-value modulation is the signal arrangement of the 16-value quadrature amplitude modulation signals, and a ratio of distances between symbols of the 16-value quadrature amplitude modulation signals and the quadrature phase shift keying is 4:10.

16. The signal processing apparatus according to claim 1, further comprising:
the 90° optical hybrid;
photoelectric conversion unit for converting the four output light beams of the 90° optical hybrid into electrical signals, respectively; and
analog-digital conversion unit for converting the four outputs from the photoelectric conversion unit into the digital signals, respectively.

17. A signal processing method comprising:
receiving four digital signals;
generating two polarization signals corresponding to two polarization components of signal light from the four digital signals by using filters having filter coefficients, the four digital signals being generated by performing photoelectric conversion and analog-digital conversion on four output light beams which are generated by making the signal light having undergone polarization division multiplexing and multi-value modulation and local light interfere with each other by using a 90° optical hybrid;
compensating for a phase difference and a frequency difference between the signal light and the local light in relation to the two polarization signals, so as to generate two carrier compensated signals;
demodulating the two carrier compensated signals;
selecting, by a selection unit, whether a determination unit performs the demodulation based on a signal arrangement of the multi-value modulation or based on a signal arrangement in which a number of multi-values of the multi-value modulation is reduced; and
updating the filter coefficients by using an output selected by the selection unit.

18. A signal processing apparatus comprising:
polarized wave separation unit for receiving four digital signals and generating two polarization signals corresponding to two polarization components of signal light from the four digital signals by using filters having filter coefficients, the four digital signals being generated by performing photoelectric conversion and analog-digital conversion on four output light beams which are generated by making the signal light having undergone polarization division multiplexing and multi-value modulation and local light interfere with each other by using a 90° optical hybrid;
carrier compensation unit for compensating for a phase difference and a frequency difference between the signal light and the local light in relation to the two polarization signals, so as to generate two carrier compensated signals;

determination unit for demodulating the two carrier compensated signals;

first error calculation unit for calculating an error of an output of the determination unit by using the two polarization signals and the output of the determination unit;

second error determination unit for calculating an error of the output of the determination unit in a method which is simpler than the first error calculation unit and does not depend on a determination result, by using the two polarization signals; and coefficient setting unit for updating the filter coefficients of the polarized wave separation unit by using either of an error determination result performed by the first error calculation unit and an error determination result performed by the second error calculation unit, wherein the coefficient setting unit updates the filter coefficients by using the error calculation result performed by the second error calculation unit until the filter coefficients converge, and updates the filter coefficients by using the error calculation result performed by the first error calculation unit after the filter coefficients converge.

19. A signal processing method comprising:

receiving four digital signals;

generating two polarization signals corresponding to two polarization components of signal light from the four digital signals by using filters having filter coefficients, the four signals being generated by performing photoelectric conversion and analog-digital conversion on four output light beams which are generated by making the signal light having undergone polarization division multiplexing and multi-value modulation and local light interfere with each other by using a 90° optical hybrid;

compensating for a phase difference and a frequency difference between the signal light and the local light in relation to the two polarization signals, so as to generate two carrier compensated signals;

demodulating, by a determination unit, the two carrier compensated signals;

calculating, by a first calculation unit, an error of an output of the determination unit by using the two polarization signals and the output of the determination unit;

calculating, by a second calculation unit, an error of the output of the determination unit in a method which is simpler than the first error calculation unit and does not depend on a determination result, by using the two polarization signals; and updating the filter coefficients by using either of an error determination result performed by the first error calculation unit and an error determination result performed by the second error calculation unit, wherein the updating the filter coefficients further updates the filter coefficients by using the error calculation result performed by second calculation unit until the filter coefficients converge, and updates the filter coefficients by using the error calculation result performed by the first error calculation unit after the filter coefficients converge.

* * * * *